United States Patent
Hasegawa et al.

(10) Patent No.: US 6,203,598 B1
(45) Date of Patent: Mar. 20, 2001

(54) FLUE GAS TREATING PROCESS AND SYSTEM

(75) Inventors: Shigeo Hasegawa; Naohiko Ukawa; Susumu Okino, all of Hiroshima; Koichiro Iwashita, Tokyo; Kazuaki Kimura, Tokyo; Atsushi Yoshioka, Tokyo; Yoshimitsu Kawanishi; Shoichi Onishi, both of Kobe; Toru Takashina, Hiroshima; Toyoshi Nakagawa, Tokyo, all of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/246,130

(22) Filed: Feb. 8, 1999

(30) Foreign Application Priority Data

Feb. 23, 1998 (JP) .................................................. 10-057415
May 18, 1998 (JP) .................................................. 10-153579

(51) Int. Cl.$^7$ ............................. B01D 53/10; B01D 53/14
(52) U.S. Cl. .................................. 95/92; 95/137; 95/235; 423/242.1
(58) Field of Search ................................. 95/92, 94, 137, 95/235; 96/135, 141, 142, 108, 271, 272, 273; 423/242.1, 243.03

(56) References Cited

U.S. PATENT DOCUMENTS

| | | | |
|---|---|---|---|
| 3,485,014 | * 12/1969 | Atsukawa et al. | 95/137 |
| 3,574,562 | * 4/1971 | Kawahata | 423/242.1 |
| 3,928,005 | * 12/1975 | Laslo | 95/94 |
| 4,080,427 | * 3/1978 | Fujita et al. | 423/242.1 |
| 4,083,944 | 4/1978 | Chalmers . | |
| 4,366,132 | * 12/1982 | Holter et al. | 423/242.1 |
| 4,366,133 | 12/1982 | Rader et al. . | |
| 4,614,645 | 9/1986 | Yoneda et al. . | |
| 4,696,804 | 9/1987 | Shinoda et al. . | |
| 4,874,400 | * 10/1989 | Jury | 95/92 |
| 5,059,406 | * 10/1991 | Sheth et al. | 423/242.1 |
| 5,344,617 | 9/1994 | Johnson . | |
| 5,344,632 | * 9/1994 | Tang | 423/244.07 |
| 5,429,808 | * 7/1995 | Kuroda et al. | 422/243.03 |
| 5,470,556 | 11/1995 | Samish . | |
| 5,624,648 | * 4/1997 | Carlsson | 423/242.1 |
| 5,840,263 | * 11/1998 | Shinoda et al. | 423/242.1 |
| 6,019,818 | * 2/2000 | Knapp | 96/272 |

FOREIGN PATENT DOCUMENTS

| | | |
|---|---|---|
| 19512786A1 | 11/1995 | (DE) . |
| 4441090 A1 | 5/1996 | (DE) . |
| 0159760A2 | 10/1985 | (EP) . |
| 0244346A2 | 11/1987 | (EP) . |
| 0437941A1 | 7/1991 | (EP) . |
| 0578629A1 | 1/1994 | (EP) . |
| 2157191 | 10/1985 | (GB) . |
| 96-17801A1 | 6/1996 | (WO) . |

* cited by examiner

*Primary Examiner*—Duane S. Smith

(57) ABSTRACT

This invention relates to a flue gas treating process including a heat recovery step for recovering heat from flue gas by means of a heat exchanger (4) and thereby cooling the flue gas, and a subsequent absorption step for bringing the flue gas into gas-liquid contact with an absorbing fluid (D) in absorption towers (12, 13) so as to remove at least $SO_2$ present in the flue gas by absorption into the absorbing fluid (D), which is characterized, for example, in that a powder addition step for spraying a powder collectable in the absorption step into the flue gas is provided prior to the heat recovery step. This invention makes it possible to provide a flue gas treating process in which a countermeasure against $SO_3$ present in flue gas can be easily achieved without resorting to ammonia injection and the flue gas can further be purified without the disadvantage of causing the injected substance to remain in the treated flue gas.

9 Claims, 14 Drawing Sheets

FLUE GAS TREATING PROCESS AND SYSTEM

FIELD OF THE INVENTION AND RELATED ART STATEMENT

This invention relates to a technique for the purification of flue gas containing $SO_2$ and $SO_3$ as sulfur oxides and, moreover, dust such as unburned carbon (e.g., flue gas produced from heavy oil-fired boilers). More particularly, it relates to a flue gas treating technique wherein a countermeasure against $SO_3$ present in flue gas which may condense to produce harmful sulfuric acid fumes or an improvement in dedusting capability can be achieved at low cost and simple operation or equipment construction.

Generally, flue gas produced, for example, from a heavy oil-fired boiler in a thermal electric power plant or the like contains sulfur oxides, which include $SO_3$ (sulfur trioxide) in addition to $SO_2$ (sulfur dioxide). The proportion of $SO_3$ to the total amount of sulfur oxides (e.g., 1,500 ppm) may vary according to the combustion temperature of the boiler, the type of the burner, the type of the combustion catalyst, and the like, but is of the order of several percent in any event. That is, $SO_3$ is present in a relatively small amount, for example, of about 30 ppm. Consequently, an important basic consideration in the desulfurization treatment of this type of flue gas is the capability to absorb $SO_2$.

However, when $SO_3$ present in flue gas produces fumes, they form harmful $H_2SO_4$ mist which is strongly corrosive and constitute a factor in scale formation. Moreover, they consist of submicron particles which can hardly be captured by mere gas-liquid contact with an absorbing fluid. For this reason, some treatment for the removal of $SO_3$ is required in order to prevent the corrosion of the equipment and the formation of scale or in order to achieve a further purification of flue gas.

Accordingly, in a flue gas treating system for use, for example, with a heavy oil-fired boiler, it has conventionally been common practice to inject ammonia into flue gas in an upstream part of the system and thereby capture $SO_3$ present in the flue gas as ammonium sulfate $[(NH_4)_2SO_4]$.

One example of such a conventional flue gas treating process and system is described below with reference to FIG. 14.

In FIG. 14, reference character 1 designates an air heater (boiler-side equipment) for heating combustion air to be supplied to a boiler (not shown) by utilizing the heat of flue gas. In this case, the apparatus or steps following this air heater 1 are within the scope of the present invention.

First, in an inlet duct 2, untreated flue gas A leaving air heater 1 is brought into contact with ammonia ($NH_3$) sprayed from a spray nozzle 2a. Thus, $SO_3$ present in the flue gas reacts with this ammonia and water in the flue gas to form ammonium sulfate. Since this ammonium sulfate is present as solid particles (i.e., dust) in the flue gas, the dust concentration in the flue gas is markedly increased. (For example, when the dust concentration before ammonia injection is 180 mg/m³N, the dust concentration after ammonia injection becomes about 360 mg/m³N.)

Then, flue gas A is introduced into a dry electrostatic precipitator 3 where dust B is removed therefrom. That part of dust B which was originally contained in flue gas A consists essentially of unburned carbon and, in the case, for example, of heavy oil-fired boilers, further contains impurities such as vanadium and magnesium. Moreover, most of the aforesaid ammonium sulfate is also collected in this electrostatic precipitator 3, discharged in dust B, and disposed of, for example, as an industrial waste.

Thereafter, in order to heat treated flue gas C to be discharged into the atmosphere, in the reheating section 5 of a gas-gas heater (GGH) as will be described later, flue gas A is introduced into the heat recovery section 4 of this GGH where it is subjected to heat recovery and thereby cooled (heat recovery step). For example, the temperature of flue gas A is cooled from about 160° C. to about 100° C.

Subsequently, at least $SO_2$ and some of the remaining small amount of dust are removed from flue gas A in absorption towers 12 and 13 (which will be described later) of a desulfurizer 10 (absorption step), heated in the reheating section 5 of GGH to a temperature suitable for discharge into the atmosphere, and then discharged from a stack (not shown) into the atmosphere as treated flue gas C.

In this case, desulfurizer 10 has a construction in which two absorption towers 12 and 13 of the liquid column type (i.e., parallel-flow and counterflow absorption towers) are juxtaposed above a tank 11 for storing an absorbent slurry (or absorbing fluid) D and in which flue gas is successively introduced into these absorption towers and brought into gas-liquid contact with the slurry within tank 11 in the respective absorption towers. Absorption towers 12 and 13 are equipped with a plurality of spray pipes 15 and 16, respectively, and the slurry sucked up by circulating pumps 17 and 18 is injected upward from these spray pipes 15 and 16 in the form of liquid columns. Moreover, in this case, a mist eliminator 20 for collecting and removing any entrained mist is installed on the downstream side of the absorption towers. In the apparatus of FIG. 14, the mist collected by this mist eliminator 20 is accumulated in a lower hopper (not shown) and returned to tank 11 through a drain pipe extending from the bottom of the hopper.

Moreover, this apparatus is equipped with a so-called rotating-arm air sparger 21 for blowing oxidizing air into the slurry within tank 11 in the form of fine air bubbles while agitating the slurry, so that the absorbent slurry having sulfur dioxide absorbed therein is brought into efficient contact with the air in tank 11 and thereby completely oxidized to form gypsum.

More specifically, in this apparatus, the absorbent slurry injected from spray pipes 15 or 16 within absorption tower 12 or 13 flows downward while absorbing sulfur dioxide and dust as a result of gas-liquid contact with flue gas, and enters tank 11 where it is oxidized by contact with a large number of air bubbles blown thereinto while being agitated with air sparger 21, and then undergoes a neutralization reaction to form gypsum. The dominant reactions occurring in the course of these treatments are represented by the following reaction formulas (1) to (3).

(Flue gas inlet section of absorption tower)

$$SO_2 + H_2O \rightarrow H^+ + HSO_3^- \qquad (1)$$

(Tank)

$$H^+ + HSO_3^- + 1/2O_2 \rightarrow 2H^+ + SO_4^{2-} \qquad (2)$$

$$2H^+ + SO_4^{2-} + CaCO_3 + H_2O \rightarrow CaSO_4 \cdot 2H_2O + CO_2 \qquad (3)$$

Thus, gypsum, a small amount of limestone (used as the absorbent), and a slight amount of dust are steadily suspended in the slurry within tank 11. In this case, the slurry within tank 11 (which may hereinafter be referred to as gypsum slurry S) is withdrawn and fed to a solid-liquid separator 23 by means of a slurry pump 22. This slurry is dewatered in solid-liquid separator 23, so that gypsum E having a low water content is recovered. On the other hand, a portion F1 of the filtrate from solid-liquid separator 23 is fed to a slurry preparation tank 26 by way of a filtrate tank 24 and a filtrate pump 25, and reused as water constituting absorbent slurry D.

Slurry preparation tank 26 is equipped with a stirrer and serves to prepare absorbent slurry D by mixing limestone G (i.e., the absorbent) introduced from a limestone silo (not shown) with filtrate F1 fed from filtrate tank 24. Absorbent slurry D within slurry preparation tank 26 is suitably fed to tank 11 by means of a slurry pump 27. In order to make up for the water gradually lost, for example, owing to evaporation in absorption towers 12 and 13, make-up water (such as industrial water) is suitably supplied, for example, to tank 11. Limestone G is used in the form of a powder usually obtained by pulverizing quarried limestone to a particle diameter of about 100 μm.

Furthermore, in order to prevent the accumulation of impurities in the water circulating through desulfurizer 10, the remainder of the filtrate within filtrate tank 24 is transferred to a waste water disposal process (not shown) as so-called desulfurization waste water F2.

According to the above-described flue gas treating process, the flue gas leaving electrostatic precipitator 3 contains little $SO_3$ and, therefore, the above-described disadvantages are avoided.

That is, if it were not for ammonia injection for removing $SO_3$, this $SO_3$ would condense in the equipment on the basis of the dew point of sulfuric acid and thereby produce fumes as described above. Generally, most of the $SO_3$ would condense into fumes as a result of cooling in the heat recovery section 4 of GGH.

Consequently, in at least the heat recovery section 4 of GGH and the parts positioned downstream thereof, troubles such as the corrosion of equipment components and the choking of the flue gas flow path due to scale formation may arise, thus causing an increase in equipment cost and maintenance cost. Moreover, since such $SO_3$ fumes remain in treated flue gas C discharged from desulfurizer 10, a wet dust precipitator needs to be installed, for example, at a position downstream of absorption tower 13 and upstream of the reheating section 5 of GGH in order to achieve a high degree of purification of the flue gas. This also causes an increase in the cost and size of the equipment.

However, if ammonia injection is performed as illustrated in FIG. 14, $SO_3$ present in flue gas is converted into ammonium sulfate at a position upstream of electrostatic precipitator 3 as described above, and the resulting ammonium sulfate is collected as dust B in electrostatic precipitator 3. Thus, the above-described problems with $SO_3$ are tentatively solved.

In flue gas treating systems for coal-fired boilers, a system in which the heat recovery section 4 of GGH is disposed on the upstream side of electrostatic precipitator 3 to carry out the heat recovery step prior to electrostatic dust collection (i.e., the so-called high-performance system) is widely employed. This system is intended to achieve high dedusting capability with simple and small-sized equipment construction by focusing attention on the fact that, when the temperature of flue gas is low, the dust collection capability per unit capacity of the electrostatic precipitator is improved on the basis of the resistivity of dust. But, in cases where oil fuels are used, this system has few merits owing to differences in the properties (e.g., electrical resistance) of dust present in flue gas. Accordingly, it is common practice to perform the aforesaid ammonia injection by employing an equipment construction as illustrated in FIG. 14.

However, the above-described conventional flue gas treating process or system involves the following various problems due to the aforesaid ammonia injection.

First of all, it is necessary to purchase expensive ammonia and supply it. This is disadvantageous from the viewpoint of operating cost.

Moreover, it is also necessary to lengthen inlet duct 2 so that ammonia may be injected and diffused. This interferes with a reduction in the size of the equipment.

Moreover, since some ammonia remains on the downstream side of electrostatic precipitator 3, nitrogen components are contained in desulfurization waste water F2. Consequently, a troublesome treatment for the removal of nitrogen, for example, by microbial denitrification is required prior to the disposal of the desulfurization waste water. This also causes an increase in operating cost and equipment size.

Moreover, ammonia is also contained in treated flue gas C and discharged into the atmosphere. Ammonia emission is undesirable from the viewpoint of further purification of flue gas. If ammonia emission is regulated, some measure for the removal of ammonia (e.g., the use of additional equipment) will be required. This will also pose a problem from the viewpoint of cost and the like.

Furthermore, ammonia is also contained in gypsum E formed as a by-product. Accordingly, depending on acceptance standards for gypsum, it may be necessary to wash the gypsum for the purpose of removing an offensive odor and the like.

In addition, the ammonium sulfate dust remaining on the downstream side of electrostatic precipitator 3 has a relatively small particle diameter and is not fully captured by gas-liquid contact in absorption towers 12 and 13. Consequently, such ammonium sulfate dust remains in treated flue gas C and also poses a problem from the viewpoint of further purification of flue gas.

Thus, the conventional flue gas treating technique is unsatisfactory for use as a technique for the purification of flue gas in which increasingly higher performance has recently come to be desired from qualitative and quantitative points of view and, in particular, as a simple and low-cost flue gas treating technique for small-scale electric power plants and independent electric power plants which are being popularized in recent years. Consequently, there is a need for further improvement in this flue gas treating technique.

OBJECT AND SUMMARY OF THE INVENTION

A first object of the present invention is to provide a flue gas treating process in which a countermeasure against $SO_3$ present in flue gas can be easily achieved without ammonia injection and the flue gas can further be purified without the disadvantage of causing the injected substance to remain in the treated flue gas.

A second object of the present invention is to provide a flue gas treating process in which a countermeasure against $SO_3$ present in flue gas and a further purification of flue gas can be easily and fully achieved with simpler operation or equipment construction.

A third object of the present invention is to employ the lime-gypsum method in the absorption step for removing $SO_2$ and the like from flue gas while maintaining the purity of gypsum formed as a by-product at a high level or decreasing the amount of industrial waste discharged.

In order to accomplish the above-described objects, the present inventors carried out intensive investigations and discovered the empirical fact that, even if ammonia injection is not performed, the above-described problems with $SO_3$ will not arise in flue gas treating systems for exclusive coal-fired boilers. The reason for this has been found to be that flue gas produced from exclusive coal-fired boilers contains a large amount of dust such as fly ash (i.e., its content is 10 to 100 times higher as compared with flue gas from oil-fired boilers).

That is, according to investigations made by the present inventors, it is believed that, when a powder such as fly ash is contained in flue gas, the condensation, if ever, of $SO_3$ present in the flue gas as a result of cooling in the heat recovery step section 4 of GGH occurs only on the particle surfaces of the aforesaid powder and, therefore, $H_2SO_4$ particles formed by the condensation of $SO_3$ exist in a state bound to the particles of the aforesaid powder, resulting in no production of harmful fumes (or sulfuric acid mist). Moreover, it has been found by experience that, if flue gas contains a powder in such a proportion that the weight ratio (D/S) of the amount of powder (D) present in a unit volume of the flue gas to the amount of $SO_3$ (S) present in a unit volume of the flue gas is not less than about 2, the formation of scale and the corrosion of equipment components due to $SO_3$ hardly occurs.

The present invention, which has been completed according to the epoch-making technical idea obtained on the basis of these findings (i.e., the idea that a countermeasure against $SO_3$ can be achieved by adding a powder positively to flue gas, solves the above-described problems to a fuller extent by means of the features described below.

According to the present invention, there is provided a first flue gas treating process for the treatment of flue gas containing at least $SO_2$ and $SO_3$ which includes a heat recovery step for recovering heat from the flue gas by means of a heat exchanger and thereby cooling the flue gas, and a subsequent absorption step for bringing the flue gas into gas-liquid contact with an absorbing fluid in an absorption tower so as to remove at least $SO_2$ present in the flue gas by absorption into the absorbing fluid, wherein a powder addition step for spraying a powder collectable in the absorption step into the flue gas is provided prior to the heat recovery step.

The first flue gas treating process of the present invention involves the following preferred embodiments:

An embodiment wherein the aforesaid powder is sprayed into the flue gas in such a proportion that the weight ratio (D/S) of the amount of dust (D) including the aforesaid powder to the amount of $SO_3$ (S) present in the flue gas is not less than 2 (i.e., $D/S \geq 2$);

An embodiment wherein, in the powder addition step, the temperature of the aforesaid powder is made lower than the temperature of the flue gas;

An embodiment wherein the aforesaid powder is sprayed jinto the flue gas in the form of a slurry comprising the aforesaid powder suspended in a liquid;

An embodiment wherein the absorbing fluid having undergone gas-liquid contact with the flue gas in the absorption step is sprayed into the flue gas as the aforesaid slurry so that the solid matter present in the absorbing fluid may be used as the aforesaid powder;

An embodiment wherein the solid matter present in the absorbing fluid having undergone gas-liquid contact with the flue gas in the absorption step is used as the aforesaid powder; and An embodiment wherein the powder addition step is carried out by drying the aforesaid solid matter with a gas obtained by withdrawing part of the flue gas, conveying the dried solid matter pneumatically, and spraying it into the flue gas.

According to the present invention, there is also provided a second flue gas treating process for the treatment of flue gas containing at least $SO_2$ and $SO_3$ which includes a heat recovery step for recovering heat from the flue gas by means of a heat exchanger and thereby cooling the flue gas, and a subsequent absorption step for bringing the flue gas into gas-liquid contact with an absorbing fluid containing a calcium compound in an absorption tower so as to remove at least $SO_2$ present in the flue gas by absorption into the absorbing fluid and, moreover, form gypsum as a by-product, wherein a powder addition step for spraying a powder collectable in the absorption step into the flue gas is provided prior to the heat recovery step, at least no independent treatment for dust removal from the flue gas is carried out prior to the heat recovery step and the absorption step so that most of the dust present in the flue gas, together with the powder, may be collected in the absorbing fluid, and the aforesaid process further includes a separation step for separating solid particles other than gypsum particles, which comprise at least the dust collected in the absorbing fluid, from the gypsum.

The second flue gas treating process of the present invention involves the following preferred embodiments:

An embodiment wherein the separation step comprises separating the aforesaid solid particles from gypsum particles by producing air bubbles in the absorbing fluid so as to allow the aforesaid solid particles having a hydrophobic surface to adhere to the air bubbles and thereby rise while allowing gypsum particles having a hydrophilic surface to stay in the absorbing fluid;

An embodiment wherein the aforesaid process further includes a dust removal step for collecting the dust or powder remaining in the flue gas having passed through the absorption step by means of a dry electrostatic precipitator or a wet precipitator(wet electrostatic precipitator);

An embodiment wherein a precharging step for aggregating and coarsening dust or powder present in the flue gas is provided subsequent to the heat recovery step and prior to the absorption step, and the precharging step is carried out by introducing the flue gas into a precharger having a discharge electrode and a dust collecting electrode, imparting an electric charge to dust or powder present in the flue gas as a result of an electric discharge from the discharge electrode, allowing the charged dust or powder to migrate to the dust collecting electrode having an opposite sign on the basis of Coulomb force, and holding it on the dust collecting electrode for a predetermined period of time; and An embodiment wherein a rough dust removal step for separating some dust or powder from the flue gas having passed through the heat recovery step and introducing it into the absorbing fluid used in the absorption step is provided prior to the precharging step.

According to the present invention, there is also provided a flue gas treating system for the treatment of flue gas containing at least $SO_2$ and $SO_3$ which includes a heat exchanger for recovering heat from the flue gas and thereby cooling the flue gas, and an absorption tower disposed downstream of the heat exchanger for bringing the flue gas into gas-liquid contact with an absorbing fluid so as to remove at least $SO_2$ present in the flue gas by absorption into the absorbing fluid, wherein powder addition means for spraying a powder into the flue gas is provided upstream of the heat exchanger.

The flue gas treating system of the present invention involves the following preferred embodiments:

An embodiment wherein the aforesaid powder addition means consists of nozzles for spraying the powder into the flue gas in the form of a slurry comprising the powder suspended in a liquid, and the aforesaid system further includes absorbing fluid supply means for withdrawing part of the flue gas having undergone gas-liquid contact with the flue gas in the absorption tower and supplying it to the nozzles as the slurry, so that the solid matter present in the absorbing fluid may be used as the powder; and An embodiment wherein the aforesaid powder addition means consists of nozzles for spraying the powder in dry form into the flue gas with the aid of a gas stream, and the aforesaid system further includes solid-liquid separation means for separating solid matter from the flue gas having undergone gas-liquid contact with the flue gas in the absorption tower, drying means for drying at least part of the solid matter separated by the solid-liquid separation means, and pneumatic conveying means for conveying the solid matter dried by the drying means pneumatically to the nozzles as the powder, so that the solid matter present in the absorbing fluid may be used as the powder.

Figure 1:
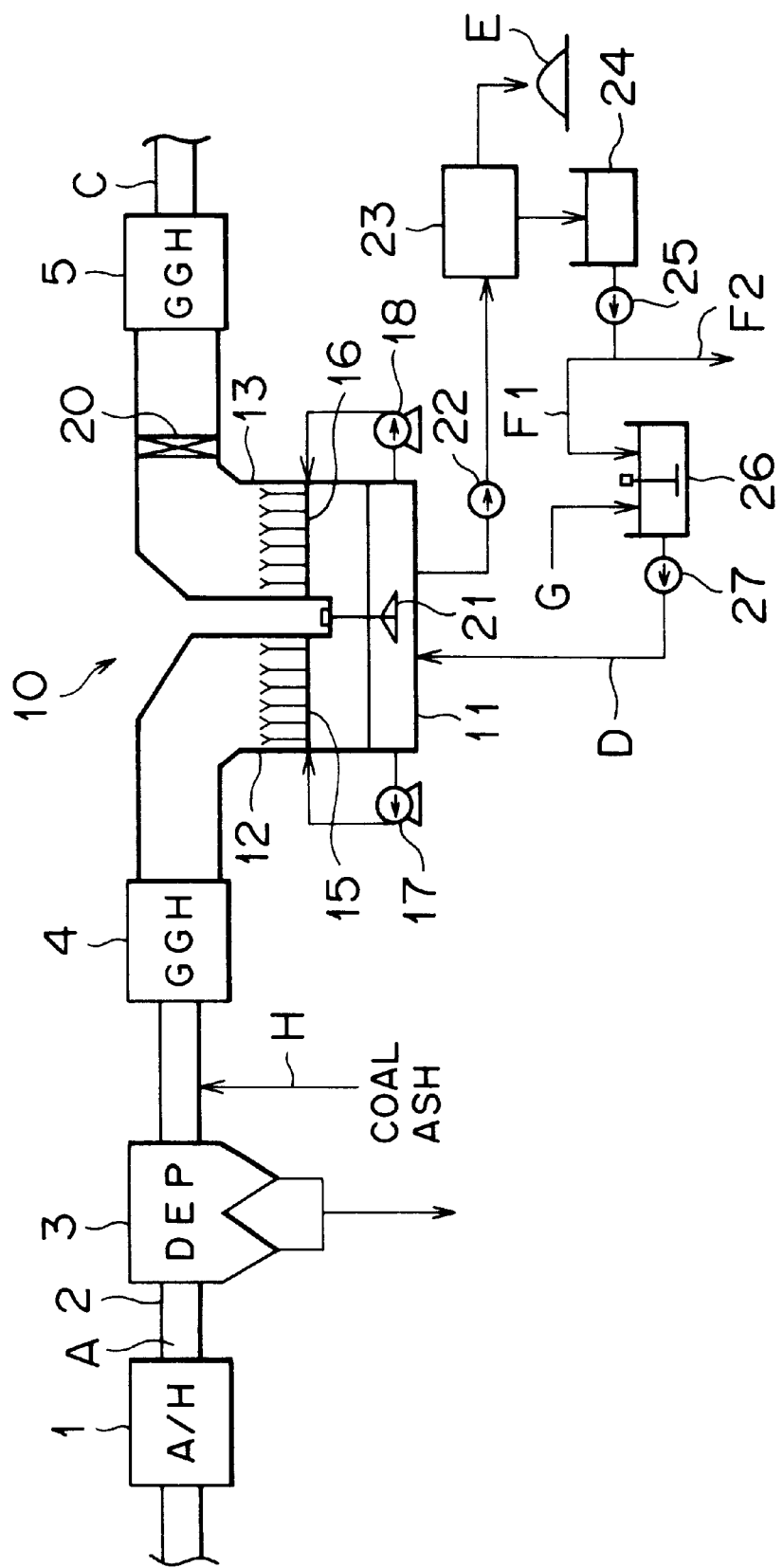
FIG. 1 is a schematic view illustrating the construction of a flue gas treating system in accordance with a first embodiment of the present invention.

The reference characters given in these figures are defined as follows: 1, air heater; 2, inlet duct; 3, dry electrostatic precipitator; 4, heat recovery section of gas-gas heater (heat exchanger); 5, reheating section of gas-gas heater; 10, desulfurizer; 12 and 13, absorption towers; 23, solid-liquid separator (solid-liquid separation means); 30, carbon separator; 40, powder addition means; 40b, nozzle; 41, diverting hopper; 42, screw feeder; 43, disintegrator (drying means); 44, flash drying cylinder; 45, fan (pneumatic conveying means); 50, rough separator; 51, fan (pneumatic conveying means); 60, precharger; 61, drier (drying means); 62, roll crusher; 63, fan (pneumatic conveying means); 71, nozzle (powder addition means); 72, pump (absorbing fluid supply means); A, untreated flue gas; A2, gas; B, B1 and B2, dust or powder; C, treated flue gas; C1, gas; D, absorbent slurry (absorbing fluid); D1, slurry (absorbing fluid having undergone contact with flue gas); E, solid matter; E1, solid matter (powder); G, pulverized limestone (powder); H, coal ash (powder); I, air; and S, gypsum slurry.

DETAILED DESCRIPTION OF PREFERRED EMBODIMENTS

Figure 14:
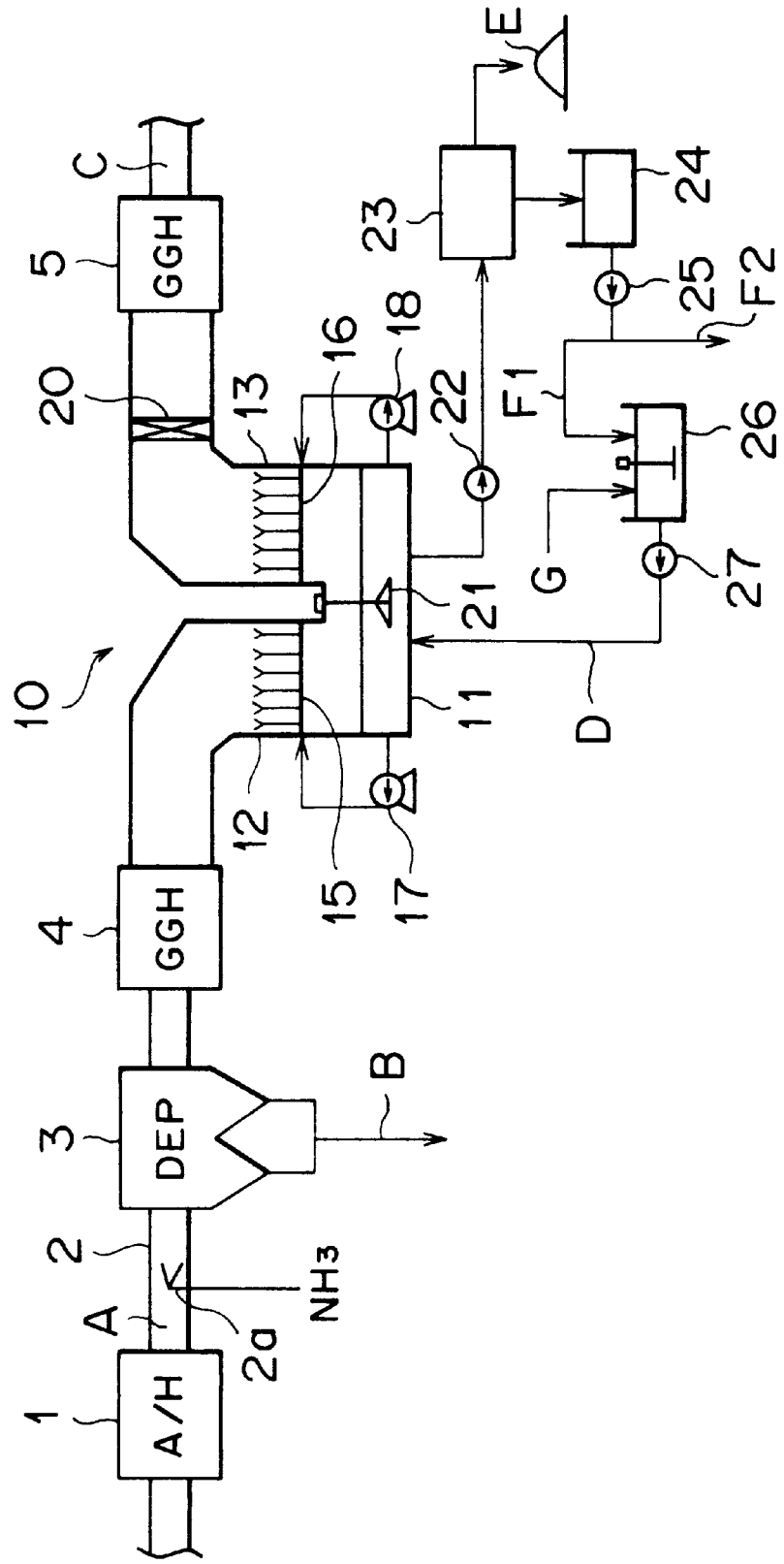
FIG. 14 is a schematic view illustrating the construction of an example of a conventional flue gas treating system.

Several embodiments of the present invention will be described hereinbelow with reference to the accompanying drawings. The same elements as included in the system of FIG. 14 are designated by the same reference characters, and the explanation thereof is omitted.

First Embodiment

A first embodiment of the present invention is explained with reference to FIG. 1. This embodiment differs from the flue gas treating system of FIG. 14 in that the ammonia injection step is omitted and in that a powder addition means (not shown) for spraying a powder is installed at a position upstream of the heat recovery section 4 of GGH and a step for spraying a powder [e.g., dust contained in the combustion exhaust gas of coal (i.e., so-called coal ash H)] into flue gas A by using the aforesaid powder addition means is provided prior to the heat recovery step using the aforesaid heat recovery section 4.

As the aforesaid coal ash H, there may used, for example, coal ash collected by the electrostatic precipitator included in the flue gas treating system of an exclusive coal-fired electric power plant. Such coal ash is usually disposed of as an industrial waste and, therefore, can be very cheaply obtained substantially at the sole expense of transportation costs.

As the aforesaid powder addition means, any suitable means, for example, designed for pneumatic conveyance or slurry conveyance may be used. An example of a usable powder addition means designed for pneumatic conveyance is one consisting of a blower or air compressor and a pipeline for conveying the powder in a stream of air, and a fixed nozzle for scattering and injecting the pneumatically conveyed powder into the flue gas duct. An example of a usable powder addition means designed for slurry conveyance is one consisting of a stirred tank for dispersing the powder in a liquid to form a slurry, a slurry pump for pressurizing and conveying the slurry formed in the stirred tank, and a fixed nozzle for scattering and injecting the pressurized and conveyed slurry into the flue gas duct.

When the powder is sprayed in the form of a slurry, it is preferable that the liquid constituting the slurry be immediately evaporated by the heat of the flue gas so as to efficiently achieve the effect of capturing $SO_3$ on the particle surfaces of the powder. Common water (e.g., industrial water) is adequate for use as this liquid. Since the temperature of flue gas A is as high as about 160° C., the water in the sprayed slurry will be evaporated at once.

The solid content of the slurry may be of the same order as the solid content of the absorbent slurry in desulfurizer 10 (e.g., about 20 to 30% by weight). Trial calculations made by the present inventors indicate that, even when the powder is sprayed in the form of a slurry, its amount may be slight relative to the flue gas as will be described later. Accordingly, the temperature of the flue gas will be reduced by only several degrees centigrade and hence exert no adverse influence on the subsequent heat recovery in GGH.

That is, even when coal ash H used as the powder is sprayed in the form of a slurry, it may be added in such a low proportion that the weight ratio (D/S) of the amount of powder (D) present in a unit volume of the flue gas to the amount of $SO_3$ (S) present in a unit volume of the flue gas is, for example, not less than 2 (i.e., $D/S \geq 2$). (For example, when the $SO_3$ concentration is 50 mg/m$^3$N, coal ash H may be added in an amount of not less than 100 mg/m$^3$N).

Thus, the above-described function of the powder is performed positively and satisfactorily, so that a countermeasure against $SO_3$ present in flue gas can be achieved at low cost and with simple operation and equipment construction without resorting to ammonia injection.

More specifically, even if $SO_3$ present in the flue gas condenses, for example, as a result of cooling in the heat recovery section 4 of GGH, most of this condensation occurs on the particle surfaces of the powder (comprising the aforesaid coal ash and others) present in the flue gas. Consequently, $H_2SO_4$ particles formed by the condensation of $SO_3$ exist in a state bound to the particles of the aforesaid powder, resulting in little production of harmful fumes (or sulfuric acid mist).

Moreover, since the added coal ash has a relatively large particle diameter of the order of 10 μm, it can be collected in absorption towers 12 and 13 of desulfurizer 10 with a relatively high degree of collection, as compared not only with conventionally encountered sulfuric acid mist but also with conventionally encountered ammonium sulfate dust. Consequently, the coal ash scarcely remains in the resulting treated flue gas C.

The coal ash collected in absorption towers 12 and 13 is dissolved or suspended in the circulating slurry, and is eventually contained in gypsum E formed as a by-product. However, its content is as low as several percent and causes no problem in most cases. On the other hand, the sulfuric acid which has been formed by the condensation of $SO_3$ on the surfaces of the coal ash and the like and has been collected together with the coal ash and the like finally undergoes the previously described neutralization reaction (3) with limestone, for example, in tank 11 of the absorption towers to yield a part of the gypsum formed as a by-product.

Thus, according to this embodiment, scale formation and corrosion due to $SO_3$ are reliably prevented in the heat recovery section 4 of GGH and the ducts positioned downstream thereof. Moreover, the following practically favorable effects are produced.

(1) The consumption of ammonia is reduced to zero, resulting in a marked saving in operating cost.

(2) The equipment for ammonia injection becomes unnecessary and the duct need not be specially lengthened in order to allow ammonia to diffuse, so that a corresponding reduction in equipment cost and equipment size can be achieved.

(3) Since no nitrogen component is contained in the desulfurization waste water, the necessity of a troublesome treatment for the removal of nitrogen is eliminated prior to the disposal of desulfurization waste water F2. From this point of view, a reduction in equipment cost and equipment size can also be achieved.

(4) The amount of ammonia contained in the treated flue gas and discharged into the atmosphere is reduced to zero. This not only contributes greatly to a further purification of flue gas, but also makes it easy to cope with ammonia emission regulations in the future.

(5) The gypsum formed as a by-product contains no ammonia. Consequently, the gypsum need not be washed, for example, in order to remove an offensive odor.

(6) Since no dust comprising sulfuric acid mist and ammonium sulfate dust remains in the treated flue gas as contrasted with the prior art, the overall dedusting capability of the system is improved without resorting to a means such as a wet dust precipitator installed on the downstream side of the absorption tower. This also contributes to a further purification of flue gas.

(7) When coal ash H used as the powder is sprayed in the form of a slurry, apparatus and devices conventionally used in a desulfurization system or the like, such as a stirred tank for the preparation of a slurry, slurry pumps, and nozzles for spraying the slurry, may be used without any modification. This is advantageous from the viewpoint of equipment cost and system operability. In addition, this makes it easier to disperse the powder uniformly in the flue gas as compared with pneumatic conveyance, so that troubles due to $SO_3$ can be prevented more efficiently.

Moreover, in this case, the particles of coal ash H are maintained at a lower temperature owing to the cooling effect produced by the evaporation of the liquid of the slurry into the flue gas (or the keeping cool effect produced by the presence of the liquid of the slurry). Consequently, the condensation of $SO_3$ on the particle surfaces of coal ash H is promoted, so that the $SO_3$-capturing function of coal ash H used as the powder is performed more satisfactorily.

(8) Furthermore, in this embodiment, the disposition and construction of dry electrostatic precipitator 3 and other apparatus and the construction of desulfurizer 10 may be exactly the same as in the conventional system illustrated in FIG. 14, except for the means for adding coal ash H. Consequently, this embodiment has a unique effect in that the existing flue gas treating system can be very easily adapted for application of the present invention.

Figure 4:
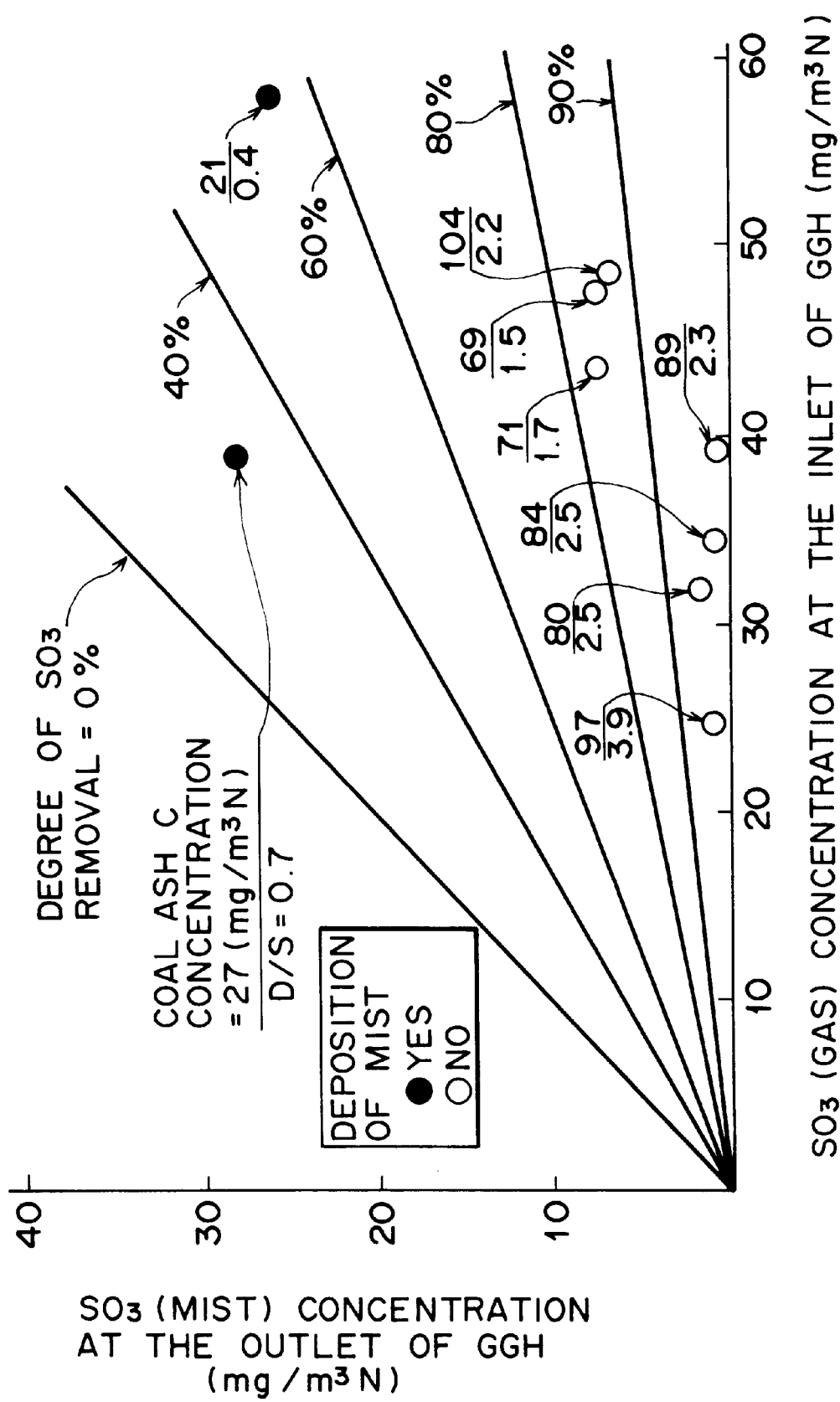
FIG. 4 is a graph showing data which demonstrate the principle of the present invention.

FIG. 4 shows actually measured data demonstrating the principle of the present invention (in particular, the addition of coal ash).

These data indicate the relationship between the $SO_3$ gas concentration at the inlet of GGH (or the inlet of the heat recovery section) and the $SO_3$ mist concentration at the outlet of GGH (or the outlet of the reheating section) (i.e., the degree of $SO_3$ removal) when the coal ash concentration in flue gas is used as a parameter. In FIG. 4, solid data points show actually measured data with which the deposition of sulfuric acid mist on the internal surfaces of apparatus such as heat recovery section 4 was observed with the naked eye, whereas open data points show actually measured data with which the deposition of sulfuric acid mist was not observed.

It can be seen from these data that about 90% of $SO_3$ was removed even at a D/S value of about 1.5, no deposition of $SO_3$ mist on the equipment surfaces was observed, and the amount of $SO_3$ mist remaining in the effluent flue gas was as small as about 10%. Consequently, it is obvious that, according to the present invention in which coal ash is added to flue gas, for example, in such a proportion that D/S is not less than about 2, $SO_3$ mist will be almost completely removed and will scarcely remain in the treated flue gas, and corrosion or scale formation due to the deposition of mist can be prevented with high reliability.

Since the above-described mist-removing effect of coal ash is a physical phenomenon in which $SO_3$ is allowed to condense on the surfaces of particles present in flue gas, powders other than coal ash (e.g., pulverized limestone) will produce similar effects.

Second Embodiment

Figure 2:
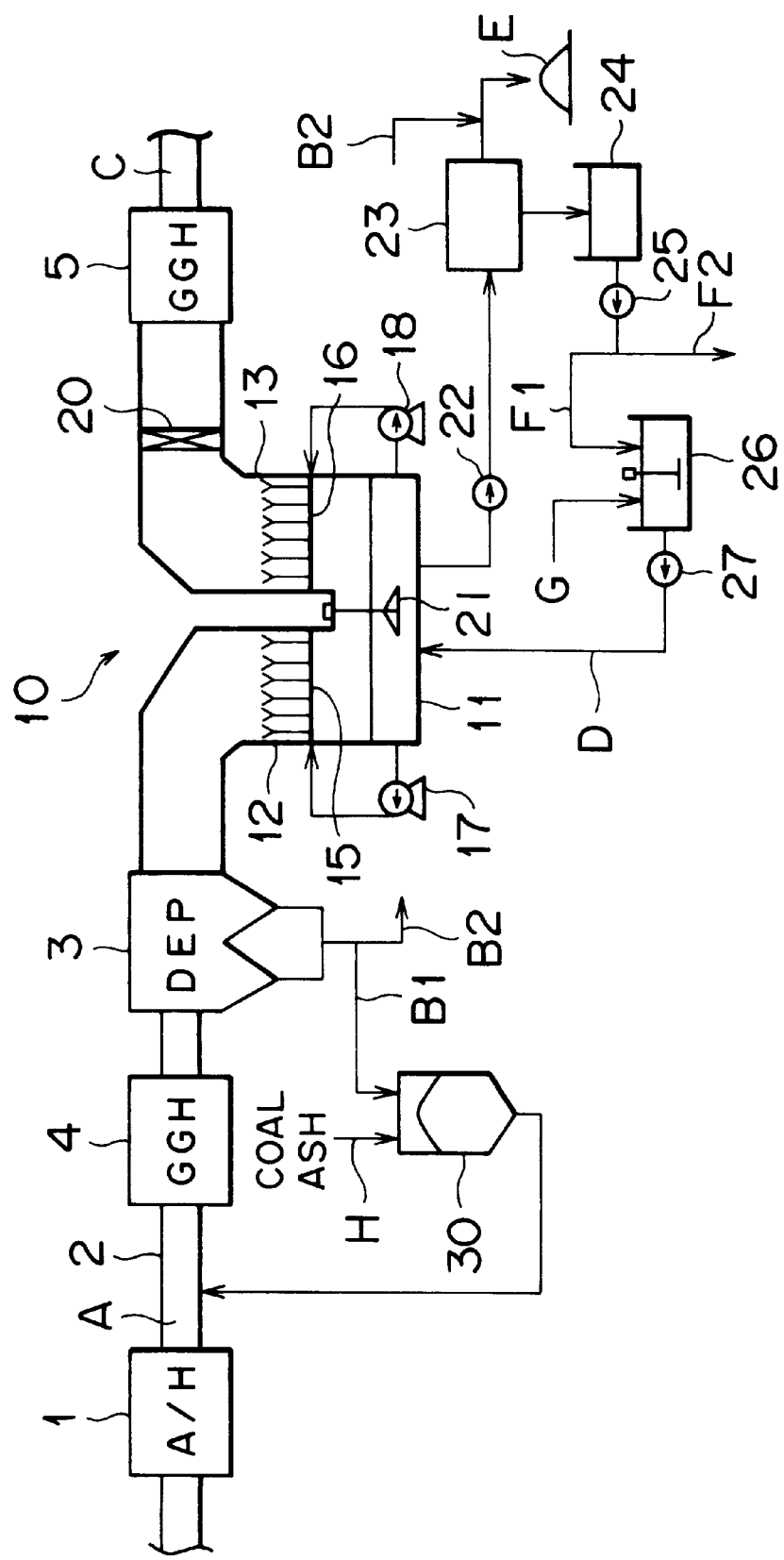
FIG. 2 is a schematic view illustrating the construction of a flue gas treating system in accordance with a second embodiment of the present invention.

Next, a second embodiment of the present invention is explained with reference to FIG. 2. Basically, this embodiment is similar to the first embodiment in that coal ash is used as the powder of the present invention and sprayed at a position upstream of the heat recovery section 4 of GGH. However, this embodiment is characterized in that a dry electrostatic precipitator 3 is installed on the downstream side of heat recovery section 4 and a dust collection step for collecting dust present in the flue gas by means of this electrostatic precipitator 3 is provided subsequent to the heat recovery step using the aforesaid heat recovery section 4 and prior to the absorption step using desulfurizer 10.

Also in this embodiment, coal ash may be sprayed into the flue gas by pneumatic conveyance, or may be sprayed in the form of a slurry.

Moreover, this embodiment is constructed in such a way that at least part B1 of the dust collected in the dust collection step using electrostatic precipitator 3 is reused as the powder of the present invention which is sprayed at a position upstream of heat recovery section 4. Specifically, in this case, part B1 of the dust collected in electrostatic precipitator 3 is first fed to a powder silo 30 where fresh coal ash H is added thereto. Then, this dust is recycled by using the previously described powder addition means to spray it again at a position upstream of heat recovery section 4. In this embodiment, therefore, the powder sprayed at a position upstream of heat recovery section 4 contains, in addition to externally supplied coal ash H, dust (e.g., fly ash) originally present in untreated flue gas A leaving air heater 1.

Moreover, in this embodiment, the remainder B2 of the dust collected in dry electrostatic precipitator 3 is homogeneously mixed with gypsum E formed in desulfurizer 10 as a by-product and discharged out of the system.

In this embodiment, it is preferable that the total amount of powder sprayed be the required minimum amount (e.g., such an amount as to cause the above-defined D/S ratio to have a value of about 2). Moreover, it is also preferable that the amount of dust B1 recycled be increased to its limit at which the sprayed powder has the ability to capture $SO_3$, and the amounts of fresh coal ash H added and dust B2 discharged be decreased to their required minimum levels. Thus, the amount of dust B2 mixed with gypsum E can be minimized to maintain the purity of gypsum E at a high level, and the amount of fresh coal ash H added can be decreased to facilitate the handling of coal ash H.

Also in this embodiment, the previously described function of the powder is positively and satisfactorily performed in the same manner as in the first embodiment, so that a countermeasure against $SO_3$ present in flue gas can be achieved at low cost and with simple operation and equipment construction without resorting to ammonia injection.

Moreover, the construction of this embodiment represents the previously described high-performance system in which heat recovery section 4 is disposed upstream of electrostatic precipitator 3, so that the capability per unit capacity of electrostatic precipitator 3 is improved. Consequently, by using a small-sized electrostatic precipitator 3, the added coal ash H can be removed from the flue gas with a high degree of collection. In addition, the dust originally contained in untreated flue gas A is also collected almost completely in this electrostatic precipitator 3 and the absorption towers 12 and 13 of desulfurizer 10, and scarcely remains in the resulting treated flue gas C.

Also in this embodiment, therefore, scale formation and corrosion due to $SO_3$ are reliably prevented, for example, in the heat recovery section 4 of GGH and the ducts positioned downstream thereof and in the hopper of electrostatic precipitator 3. Moreover, the same effects as the effects (1) to (7) previously described in connection with the first embodiment are produced.

Furthermore, in this embodiment, the powder (comprising coal ash H and others) used to capture $SO_3$ is recycled. This has a unique effect in that the amount of fresh coal ash H supplied can be decreased and, moreover, the amount of dust B2 mixed with gypsum E can be minimized to maintain the purity of gypsum E at a high level.

Furthermore, since dust B2 is mixed with gypsum E, the amount of dust discharged as an industrial waste can be reduced to zero. This also contributes, for example, to a saving in operating cost.

It goes without saying that, if gypsum having a higher purity is desired, all or part of dust B2 may not be mixed with gypsum E.

Third Embodiment

Figure 3:
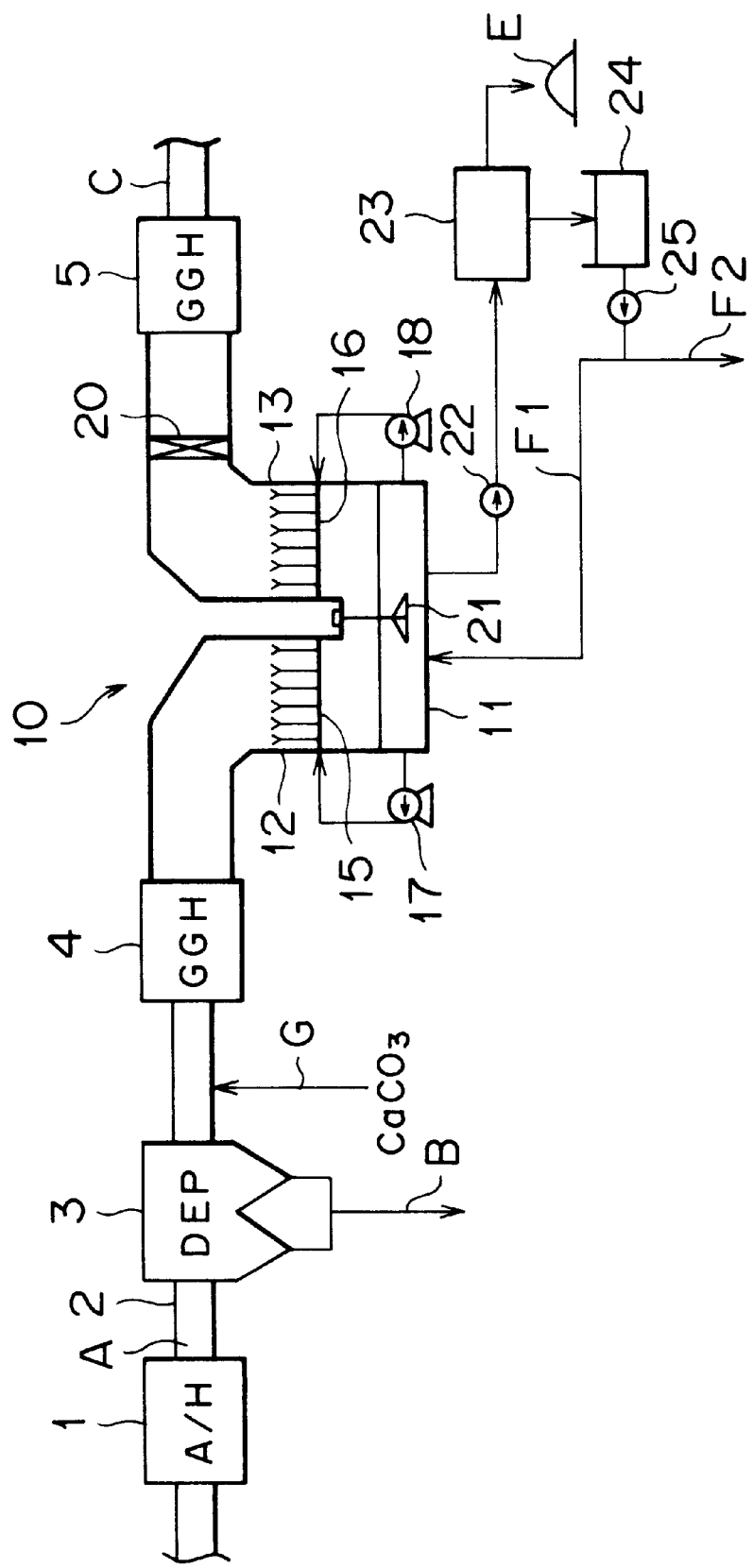
FIG. 3 is a schematic view illustrating the construction of a flue gas treating system in accordance with a third embodiment of the present invention.

Next, a third embodiment of the present invention is explained with reference to FIG. 3. This embodiment is similar to the first embodiment in that a powder addition means for spraying a powder is installed at a position upstream of the heat recovery section 4 of GGH and, by using this powder addition means, a powder prepared by pulverizing limestone ($CaCO_3$) (e.g., the aforesaid limestone G) is sprayed into flue gas A as the powder of the present invention.

Also in this embodiment, pulverized limestone may be sprayed into the flue gas by pneumatic conveyance, or may be sprayed in the form of a slurry.

Moreover, in this embodiment, slurry preparation tank 26 and slurry pump 27 shown in FIG. 14 are omitted and filtrate F1 is returned directly to tank 11 of the absorption towers. The total amount of limestone required for use as the absorbent in the absorption step in desulfurizer 10 and in the formation of gypsum as a by-product is added to the flue gas as the aforesaid powder at a position upstream of heat recovery section 4, so that the absorbent is indirectly supplied to the slurry within tank 11 of desulfurizer 10.

In this case, the amount of limestone G required for use as the absorbent is basically in stoichiometric proportion to the amount of sulfur oxides present in the flue gas. When flue gas A comprises common combustion exhaust gas (e.g., flue gas produced from an oil fuel such as heavy oil), trial calculations made by the present inventors have revealed that the weight ratio (D/S) of the amount of powder (D) present in a unit volume of the flue gas to the amount of $SO_3$ (S) present in a unit volume of the flue gas is equal to about 28.

In this embodiment, therefore, the previously described function of the powder is performed positively and satisfactorily, so that a countermeasure against $SO_3$ present in flue gas can be achieved at low cost and with simple operation and equipment construction without resorting to ammonia injection.

More specifically, even if $SO_3$ present in the flue gas condenses, for example, as a result of cooling in the heat recovery section 4 of GGH, most of this condensation occurs on the particle surfaces of the powder (comprising the aforesaid limestone and others) present in the flue gas. Consequently, $H_2SO_4$ particles formed by the condensation of $SO_3$ exist in a state bound to the particles of the aforesaid powder, resulting in little production of harmful fumes (or sulfuric acid mist).

Moreover, the added limestone has a large particle diameter of the order of 100 μm and, therefore, can be collected in absorption towers 12 and 13 of desulfurizer 10 with a markedly higher degree of collection, as compared not only with conventionally encountered sulfuric acid mist but also with conventionally encountered ammonium sulfate dust. Consequently, the limestone scarcely remains in the resulting treated flue gas C.

The limestone collected in absorption towers 12 and 13 is dissolved or suspended in the circulating slurry, and acts as the aforesaid absorbent (or alkaline agent) for neutralizing the slurry to form gypsum as a by-product. On the other hand, the sulfuric acid which has been formed by the condensation of $SO_3$ on the surfaces of the limestone and the like and has been collected together with the limestone and the like finally undergoes the previously described neutralization reaction (3) with limestone, for example, in tank 11 of the absorption towers to yield a part of the gypsum formed as a by-product.

Also in this embodiment, therefore, scale formation and corrosion due to $SO_3$ are reliably prevented, for example, in the heat recovery section 4 of GGH and the ducts positioned downstream thereof. Moreover, the same effects as the effects (1) to (7) previously described in connection with the first embodiment are produced.

Furthermore, in this embodiment, the total amount of limestone required for use in the absorption step in desulfurizer 10 is supplied as the aforesaid powder, and the conventionally used slurry preparation tank 26 and slurry pump 27 are omitted. Thus, this embodiment has a unique effect in that a further reduction in equipment cost and equipment size can be achieved.

Figure 5:
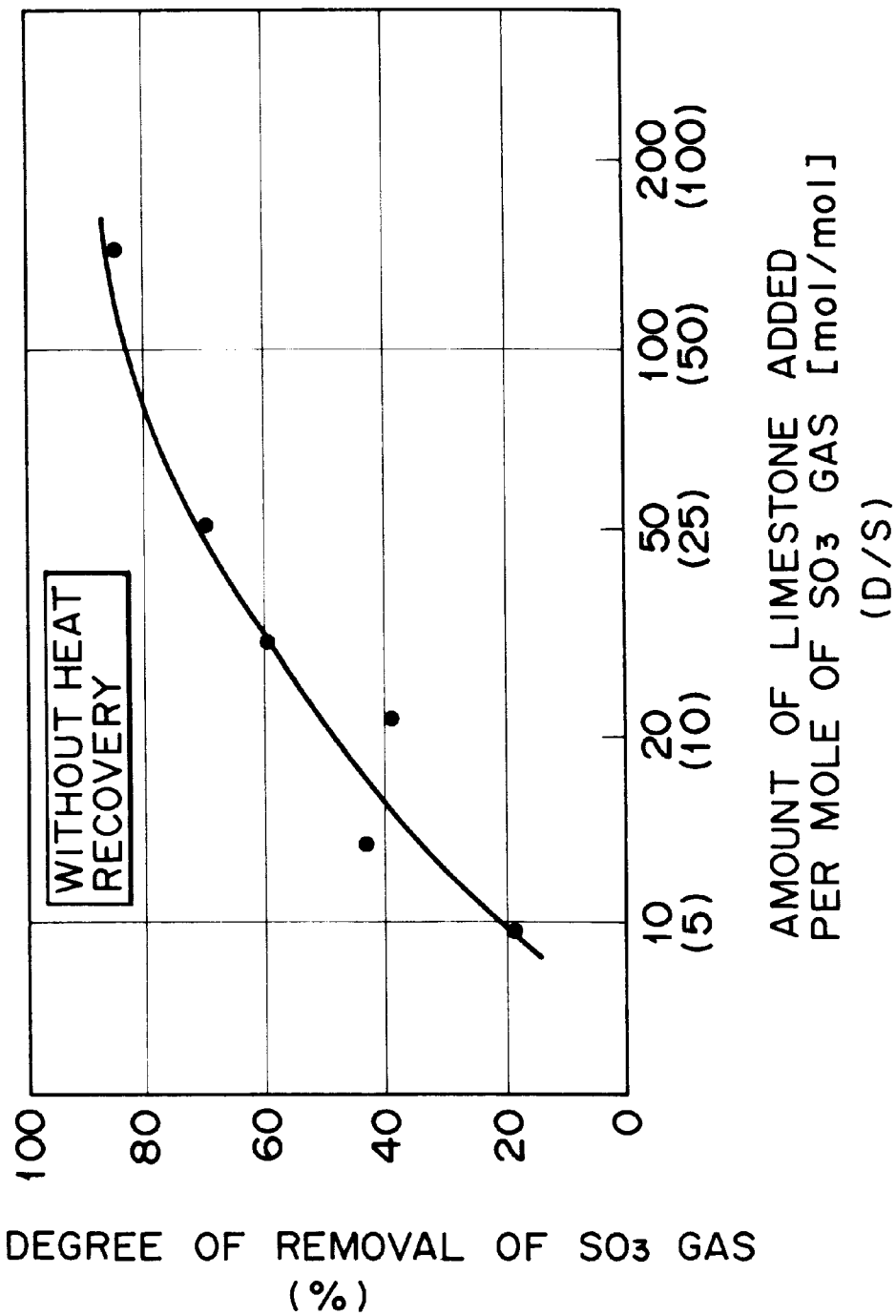
FIG. 5 is a graph showing other data which demonstrate the principle of the present invention.

FIG. 5 shows actually measured data demonstrating the principle of the present invention (in particular, the addition of limestone).

These data indicate the relationship between the amount of limestone added and the proportion of $SO_3$ gas removed by condensation on the particle surfaces of the limestone when a slurry composed of powdered limestone and water (with a concentration of about 20–30% by weight) was simply sprayed into flue gas containing about 3.7–11.5 ppm of $SO_3$ and no subsequent heat recovery from the flue gas was performed. These data reveal that $SO_3$ can be effectively removed simply by spraying a slurry of limestone into the flue. Consequently, it can be seen that, according to the present invention in which heat recovery is performed after the addition of a powder so as to allow $SO_3$ to condense positively, a high degree of $SO_3$ removal can be achieved even at a low D/S value.

Fourth Embodiment

Figure 6:
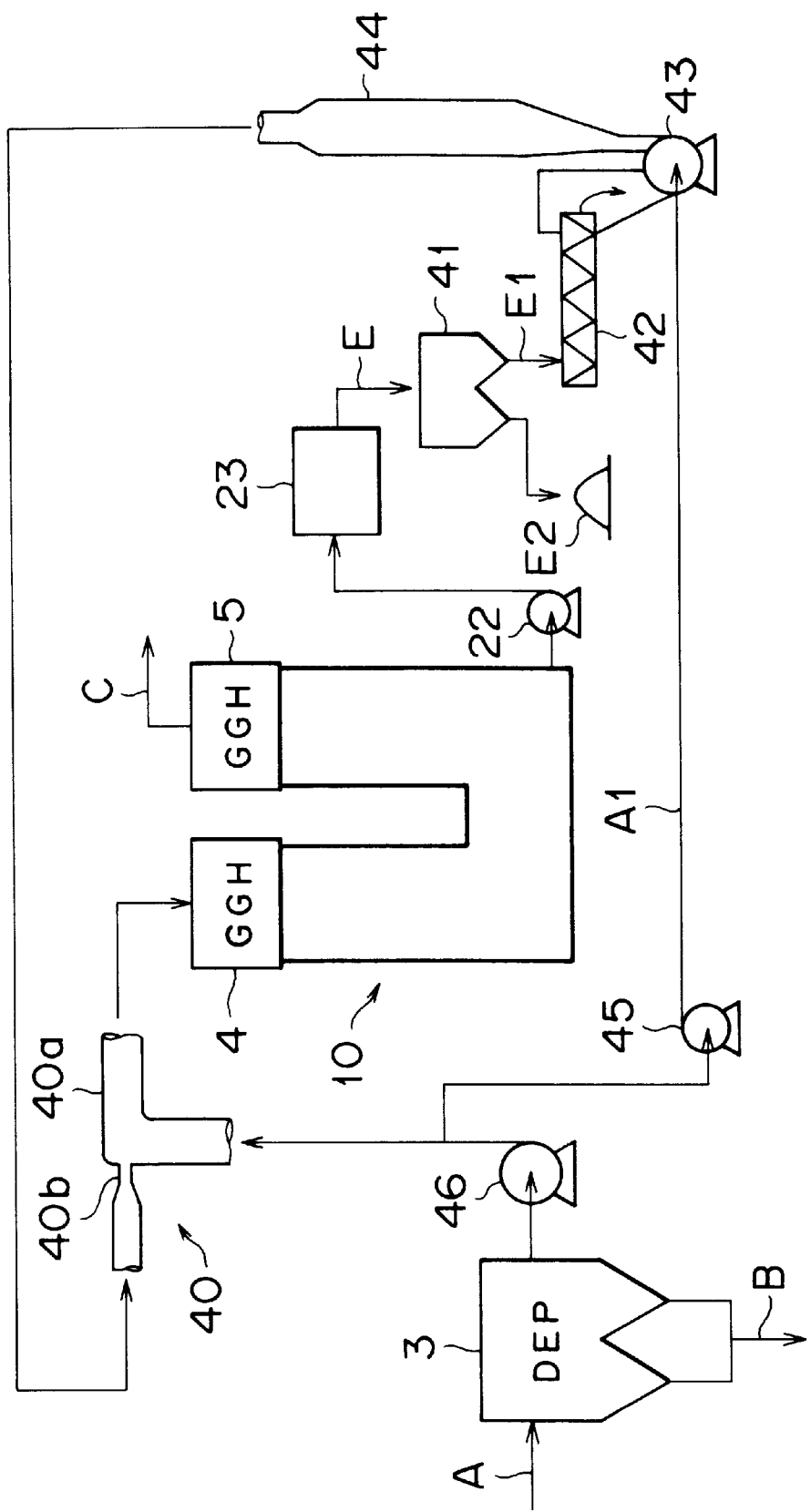
FIG. 6 is a schematic view illustrating the construction of a flue gas treating system in accordance with a fourth embodiment of the present invention.

Next, a fourth embodiment of the present invention is explained with reference to FIG. 6. It is to be understood that the detailed illustration of the construction of desulfurizer 10 is omitted in FIGS. 6 to 8.

Also in this embodiment, a powder addition means 40 for spraying a powder is installed at a position upstream of the heat recovery section 4 of GGH. However, part E1 of solid matter E consisting essentially of gypsum formed as a by-product in desulfurizer 10 is pneumatically conveyed to the aforesaid powder addition means 40 while being dried with a gas A1 obtained by withdrawing part of flue gas A, and the resulting gypsum in dry form is sprayed into flue gas A as the powder of the present invention.

More specifically, solid matter E dewatered and separated in solid-liquid separator 23 is divided by a diverting hopper 41 into the part E1 required for adjustment of the aforesaid weight ratio (D/S) in flue gas A and the remainder E2. The remainder E2 of solid matter E is handled in the manner conventionally known for gypsum formed as a by-product. On the other hand, the diverted part E1 of solid matter E is introduced into a disintegrator 43 at a predetermined flow rate, for example, by means of a screw feeder 42, disintegrated therein, dried in a flash drying cylinder 44, and then supplied to powder addition means 40.

The aforesaid disintegrator 43 is a rotary disintegrator. A rotary disintegrator is a type of impact disintegrator in which a muddy material is dispersed into a gas by means of impact rods fastened coaxially to a rotating disc, like the blades of a blower, and discharged and conveyed in a suspended state. When a hot gas and a wet material are treated therein, pulverization and drying are effected at the same time.

A gas A1 obtained by withdrawing part of flue gas A by means of a drying fan 45 is introduced into the aforesaid disintegrator 43. Thereafter, this gas, together with the disintegrated solid matter E1, is supplied to powder addition means 40 by way of flash drying cylinder 44. In this case, gas A1 comprises a hot gas obtained by withdrawing part of flue gas A at a position downstream of a flue gas fan 46 (not shown in FIG. 1 and the like) which is usually installed on the downstream side of electrostatic precipitator 3.

Powder addition means 40 comprises a nozzle 40b through which gas A1 having passed through flash drying cylinder 44 and powdered solid matter E1 present therein are injected into duct 40a for flue gas A under the pressure exerted by drying fan 45. In this embodiment, nozzle 40b comprises a small-diameter pipe connected to the wall of duct 40a so as to open to the internal space thereof, as shown in FIG. 6. However, it is to be understood that the present invention is not limited to this embodiment.

In this embodiment, part E1 of solid matter E consisting essentially of gypsum formed as a by-product in desulfurizer 10 is diverted and introduced into disintegrator 43, where solid matter E1 is disintegrated into a powder and dried by heat exchange with the introduced gas A1. The powdered solid matter E1, which has been dried in disintegrator 43 to some extent, is more fully by heat exchange with gas A1 while being pneumatically conveyed through flash drying cylinder 44. Thereafter, the dried solid matter E1, together with gas A1, is sprayed into flue gas A by powder addition means 40 at a position upstream of heat recovery section 4. The powdered solid matter E1 and gas A1 that are sprayed into flue gas A in this manner has a temperature of about 100° C., which is lower than the temperature of flue gas A (i.e., about 160° C.).

Also in this embodiment, therefore, the previously described function of the powder is performed positively and satisfactorily, so that a countermeasure against $SO_3$ present in flue gas can be achieved at low cost and with simple operation and equipment construction without resorting to ammonia injection.

More specifically, even if $SO_3$ present in the flue gas condenses, for example, as a result of cooling in the heat recovery section 4 of GGH, most of this condensation occurs on the particle surfaces of the powder (comprising the aforesaid solid matter E1 and others) present in the flue gas. Consequently, $H_2SO_4$ particles formed by the condensation of $SO_3$ exist in a state bound to the particles of the aforesaid powder, resulting in little production of harmful fumes (or sulfuric acid mist).

Moreover, the gypsum particles forming the principal constituent of the added solid matter E1 have a large particle diameter of the order of 20 to 40 $\mu m$ and, therefore, can be collected in desulfurizer 10 with a high degree of collection, as compared not only with conventionally encountered sulfuric acid mist but also with conventionally encountered ammonium sulfate dust. Consequently, the gypsum particles scarcely remain in the resulting treated flue gas C.

The solid matter E1 collected in desulfurizer 10 is dissolved or suspended in the circulating slurry, and returned as solid matter present in the slurry. On the other hand, the sulfuric acid which has been formed by the condensation of $SO_3$ on the surfaces of solid matter E1 and the like and has been collected together with these particles finally undergoes the previously described neutralization reaction (3) with limestone in desulfurizer 10 to yield a part of the gypsum formed as a by-product.

Also in this embodiment, therefore, scale formation and corrosion due to $SO_3$ are reliably prevented, for example, in the heat recovery section 4 of GGH and the ducts positioned downstream thereof. Moreover, the same effects as the effects (1) to (6) previously described in connection with the first embodiment are produced.

Furthermore, in this embodiment, solid matter E1 present in the slurry within desulfurizer 10 is supplied as the aforesaid powder, so that the raw material and transportation costs for the powder are not required at all. Thus, this embodiment has a unique effect in that a further reduction in cost can be achieved as compared, for example, with the first embodiment in which coal ash is supplied as the powder.

According to the equipment construction of this embodiment, the D/S ratio in flue gas can be adjusted to a value of about 10, for example, by employing the following operating conditions. As can be seen from the actually measured data which have been shown previously, it has been confirmed that troubles due to $SO_3$ mist can be prevented at a D/S value of about 10.

Flow rate of flue gas A: $110 \times 10^4$ m³N/h $SO_3$ concentration in flue gas A: 20 ppm Temperature of gas A1 (at the inlet of disintegrator 43): 154° C.

Temperature of gas A1 (at the outlet of flash drying cylinder 44): 100° C.

Flow rate of gas A1: 4,300 m³N/h

Flow rate of diverted gypsum-based solid matter E1: 880 kg/h

Fifth Embodiment

Next, a fifth embodiment of the present invention is explained with reference to FIG. 7.

Similarly to the fourth embodiment, this embodiment is such that a powder addition means 40 for spraying a powder is installed at a position upstream of the heat recovery section 4 of GGH. However, part E1 of solid matter E consisting essentially of gypsum formed as a by-product in desulfurizer 10 is pneumatically conveyed to the aforesaid powder addition means 40 while being dried with part of treated flue gas C, and the resulting gypsum in dry form is sprayed into flue gas A as the powder of the present invention.

More specifically, this embodiment is the same as the fourth embodiment, except that a gas C1 obtained by withdrawing part of treated flue gas C by means of a drying fan 51 is utilized as the drying gas introduced into disintegrator 43. This embodiment is preferred where the $SO_3$ concentration in flue gas A is low.

Also in this embodiment, the previously described function of the powder is performed positively and satisfactorily, so that a countermeasure against $SO_3$ present in flue gas can be achieved at low cost and with simple operation and equipment construction without resorting to ammonia injection. Thus, the same effects as those described above in connection with the fourth embodiment are produced.

According to the equipment construction of this embodiment, the D/S ratio in flue gas can be adjusted to a value of about 4, for example, by employing the following operating conditions. As can be seen from the actually measured data which have been shown previously, it has been confirmed that troubles due to $SO_3$ mist can be prevented at a D/S value of about 4.

Flow rate of flue gas A: $110 \times 10^4$ m³N/h $SO_3$ concentration in flue gas A: 10 ppm Temperature of gas C1 (at the inlet of disintegrator 43): 103° C.

Temperature of gas C1 (at the outlet of flash drying cylinder 44): 80° C.

Flow rate of gas C1: 2,000 m³N/h

Flow rate of diverted gypsum-based solid matter E1: 175 kg/h

Sixth Embodiment

Figure 8:
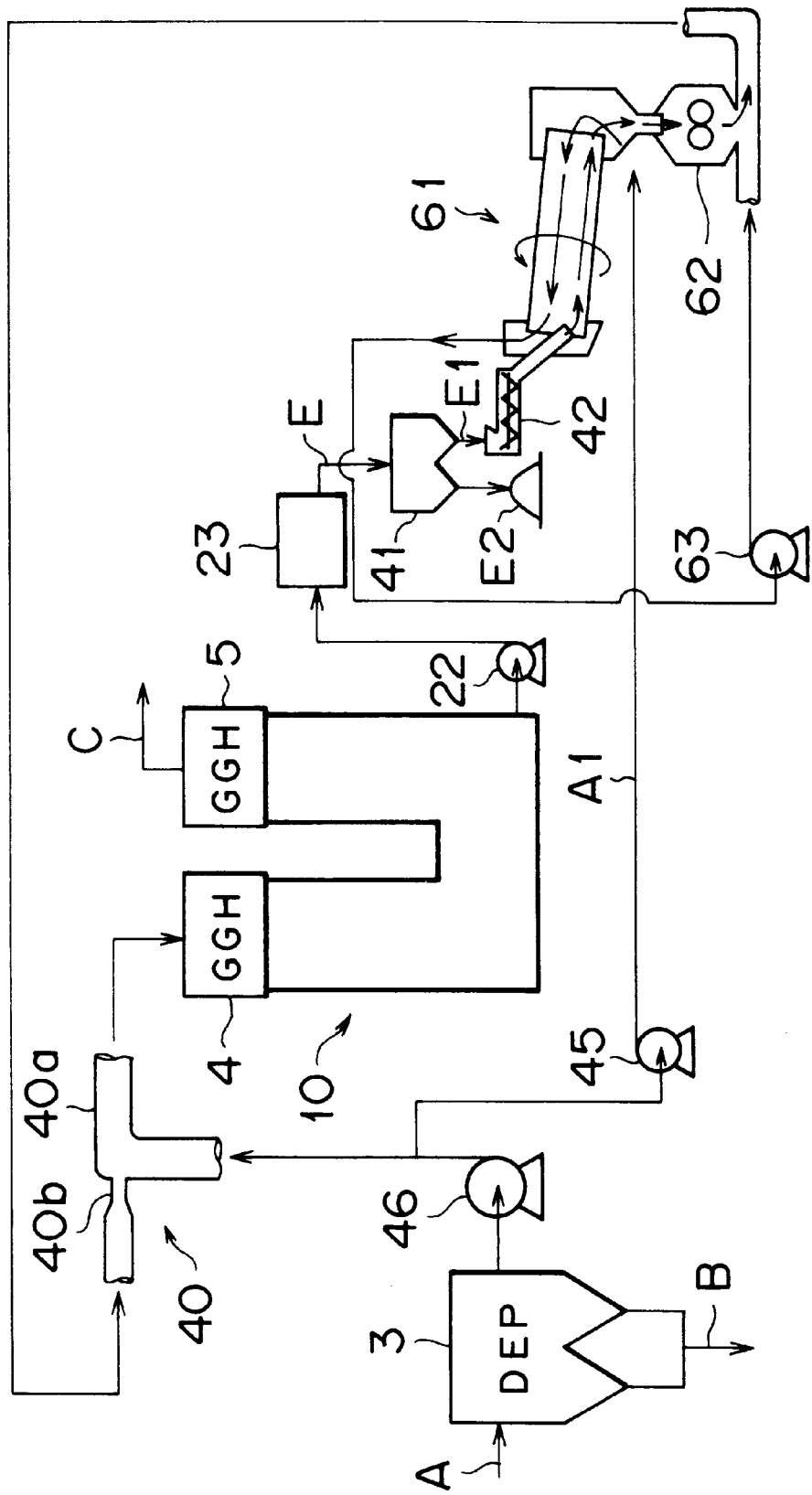
FIG. 8 is a schematic view illustrating the construction of a flue gas treating system in accordance with a sixth embodiment of the present invention.

Next, a sixth embodiment of the present invention is explained with reference to FIG. 8.

This embodiment is the same as the fourth embodiment, except that a rotating cylinder type drier (i.e., rotary drier) 61 and a roll crusher 62 are used in place of disintegrator 43 and flash drying cylinder 44. In this case, gypsum-based solid matter E1 in wet form is introduced into drier 61 at its upstream end, moves downstream with the rotation of drier 61, and is discharged in dry form. Then, this gypsum-based solid matter E1 in dry form is introduced into roll crusher 62 and crushed therein. The crushed solid matter E1 is dispersed into a gas, conveyed to powder addition means 40, and sprayed into flue gas A as the powder of the present invention while remaining in dry form.

On the other hand, a drying gas A1 obtained by withdrawing part of flue gas A is introduced into rotary drier 61 at its downstream end, brought into contact with gypsum-based solid matter E1 in order to dry it, and discharged from the upstream end of rotary drier 61. In this case, drying gas A1 discharged from rotary drier 61 is supplied to the outlet side of roll crusher 62 by means of a fan 63 and functions as a gas for pneumatically conveying gypsum-based solid matter E1 in dry form, and then added to flue gas A together with gypsum-based solid matter E1. Thus, drying gas A1 is finally returned to flue gas A1.

Also in this embodiment, the previously described function of the powder is performed positively and satisfactorily, so that a countermeasure against $SO_3$ present in flue gas can be achieved at low cost and with simple operation and equipment construction without resorting to ammonia injection. Thus, the same effects as those described above in connection with the fourth embodiment are produced.

According to the equipment construction of this embodiment, the D/S ratio in flue gas can be adjusted to a value of about 10, for example, by employing the following operating conditions.

Flow rate of flue gas A: $110 \times 10^4$ $m^3N/h$ $SO_3$ concentration in flue gas A: 20 ppm Temperature of gas A1 (at the inlet of drier 61): 155° C.

Temperature of gas A1 (at the outlet of drier 61): 120° C.

Flow rate of gas A1: 6,700 $m^3N/h$

Flow rate of diverted gypsum-based solid matter E1: 875 kg/h

Seventh Embodiment

Figure 9:
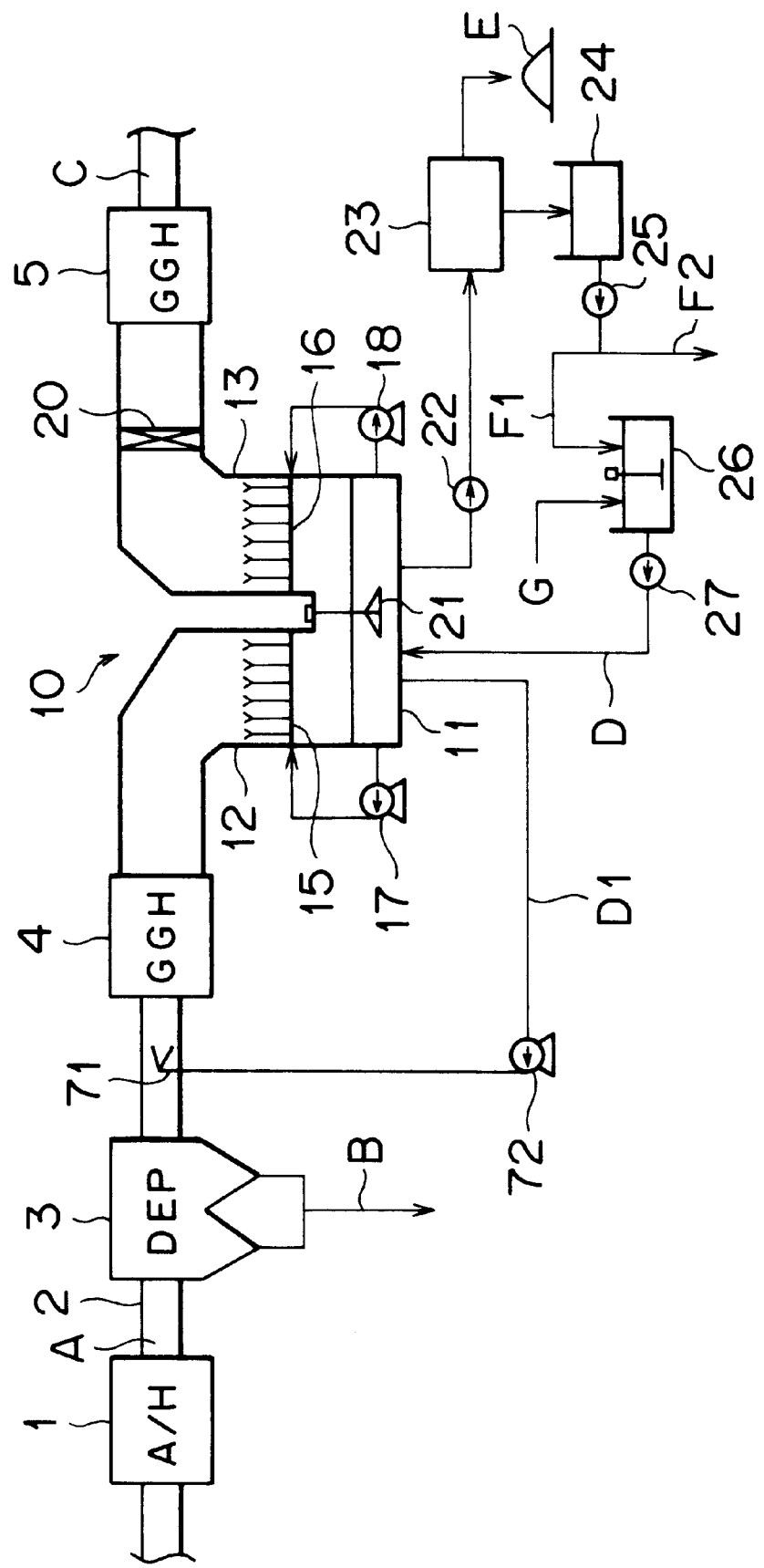
FIG. 9 is a schematic view illustrating the construction of a flue gas treating system in accordance with a seventh embodiment of the present invention.

Next, a seventh embodiment of the present invention is explained with reference to FIG. 9.

This embodiment is such that a nozzle 71 for spraying the powder in the form of a slurry (i.e., the powder addition means) is installed at a position upstream of the heat recovery section 4 of GGH, and a slurry (or absorbing fluid) D1 withdrawn from absorption tower tank 11 of desulfurizer 10 by means of a pump 72 (i.e., the absorbing fluid supply means) is sprayed into flue gas A.

Also in this embodiment, when the D/S ratio in flue gas A is adjusted to a predetermined value by spraying slurry D1 in an amount corresponding to the $SO_3$ concentration in flue gas A, the previously described function of the powder is performed positively and satisfactorily, so that a countermeasure against $SO_3$ present in flue gas can be achieved at low cost and with simple operation and equipment construction without resorting to ammonia injection. Thus, the same effects as those described above in connection with the fourth embodiment are produced.

More specifically, since the water constituting the aforesaid slurry D1 is immediately evaporated by the heat of flue gas A, the aforesaid slurry D1 can perform the same function as in the case where the gypsum-based solid matter constituting slurry D1 is sprayed into flue gas A in dry form (i.e., the $SO_3$-capturing function).

Moreover, when the aforesaid slurry is sprayed into the flue gas, the particles of the solid matter (i.e., the particles of the powder of the present invention) are maintained at a lower temperature owing to the cooling effect produced by the evaporation of the liquid of the slurry into the flue gas (or the keeping cool effect produced by the presence of the liquid of the slurry) as described previously. Consequently, the condensation of $SO_3$ on the surfaces of these particles is promoted, so that the $SO_3$-capturing function is performed more satisfactorily.

Furthermore, this embodiment is constructed in such a way that part of absorbing fluid D1 within the desulfurizer is withdrawn and sprayed directly into flue gas at a position upstream of GGH, and hence has a unique effect in that the equipment construction is highly simplified and, therefore, a great advantage is gained from the viewpoint of cost. More specifically, an embodiment in which, for example, coal ash is sprayed in the form of a slurry requires additional apparatus such as a tank for the preparation of a slurry and a storage means for coal ash, and an embodiment in which gypsum-based solid matter is dried and sprayed into flue gas (e.g., the above-described fourth embodiment) requires additional apparatus such as a drier for drying the gypsum-based solid matter. However, this equipment does not require such apparatus at all.

It is to be understood that the present invention is not limited to the above-described first to seventh embodiments, but may also be practiced in various other ways. For example, the powder of the present invention is not limited to limestone, coal ash and gypsum, but there may also be used any powder that allows $SO_3$ to condense on the particle surfaces thereof and can be collected in a common electrostatic precipitator or the absorption tower of a desulfurizer. However, the aforesaid limestone, coal ash and gypsum are familiar materials which have conventionally been handled in flue gas treating systems, and the existing equipment and handling techniques may be used without any modification. Thus, they have the advantages that they can be obtained and handled easily, and that they exert no adverse influence on the operation of the whole system and, on the contrary, the trouble of supplying limestone to the absorption tower tank can be saved as described previously.

Moreover, in order to promote the condensation of $SO_3$ on the particle surfaces of the powder, a powder (or a slurry thereof) having a temperature lower than that of flue gas [e.g., a powder (or a slurry thereof) which has been forcedly cooled as required] may be sprayed into the flue gas. This allows $SO_3$ to condense more effectively on the particle surfaces of the powder, so that the production of harmful $SO_3$ mist can be prevented more satisfactorily and more easily.

Moreover, the powder of the present invention may comprise, for example, both limestone and coal ash, and they may be added in admixture or separately. Even when limestone alone is used, it may be added in such a way that only the part thereof required to capture $SO_3$ is sprayed into flue gas and the remainder is supplied directly to the absorption tower tank of the desulfurizer as usual.

Figure 7:
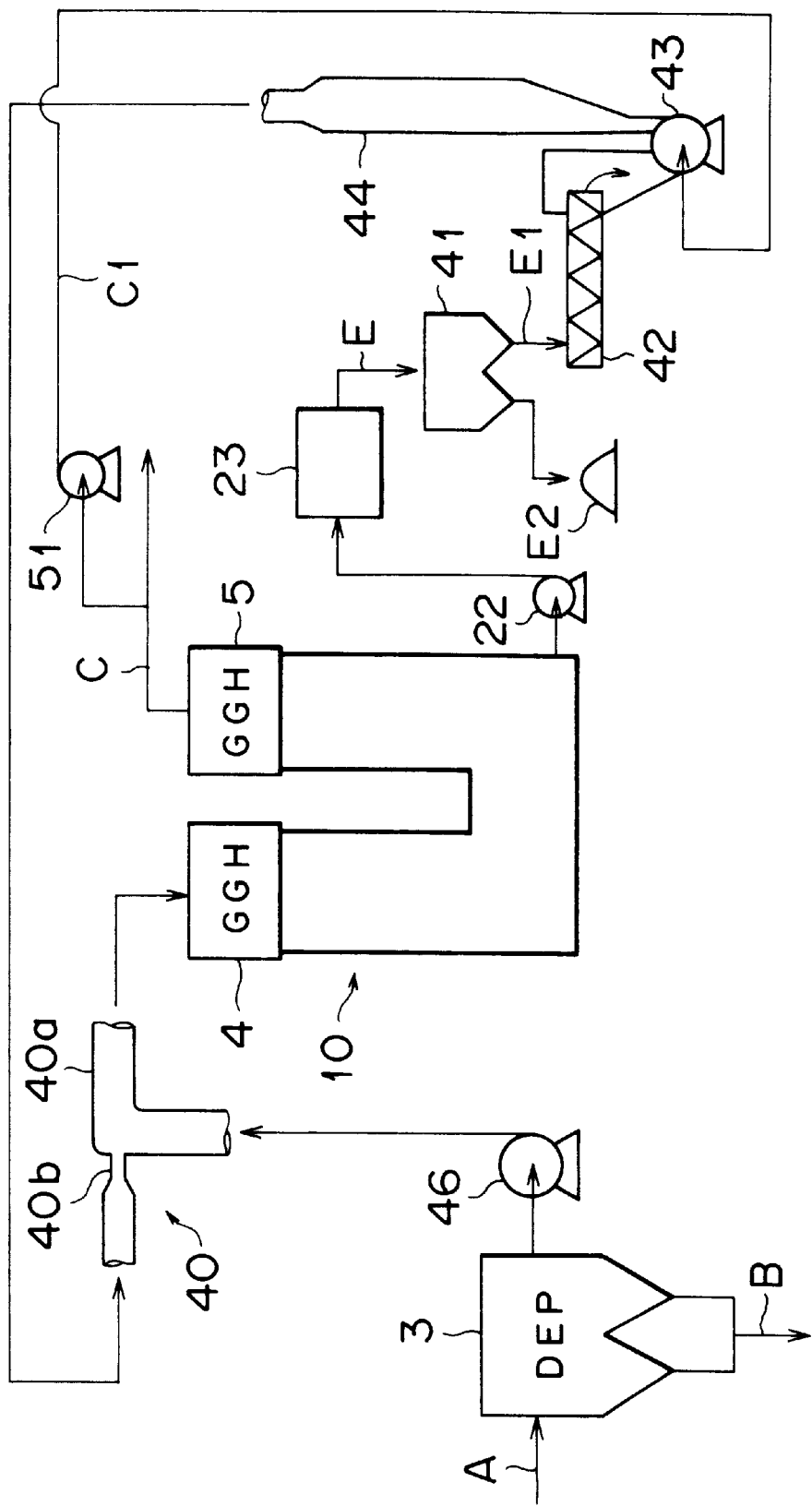
FIG. 7 is a schematic view illustrating the construction of a flue gas treating system in accordance with a fifth embodiment of the present invention.

Moreover, it goes without saying that, even when the rotating cylinder type drier described in connection with the sixth embodiment (FIG. 8) is used for drying purposes in an embodiment in which the solid matter consisting essentially of gypsum formed as a by-product in the desulfurizer (or the absorption step) is dried and sprayed into flue gas as the powder of the present invention, part C1 of treated flue gas C may be utilized as the drying gas, as described above in connection with the fifth embodiment (FIG. 7).

Moreover, as the drying means for drying the aforesaid gypsum-based solid matter, there may employed a drier of the indirect heating type in which the gypsum-based solid matter is dried, for example, by the heat of steam supplied from the outside of the flue gas treating system.

Furthermore, it goes without saying that the construction of the absorption step or absorption tower of the present invention is not limited to the above-described embodiments. For example, the absorption tower may comprise a single absorption tower, and various types of absorption towers (or gas-liquid contact apparatus) including packed tower, spray tower and bubbling tower types may be employed. In addition, the present invention is not limited to the use of a calcium compound (e.g., limestone) as the absorbent, but a desulfurization process using, for example, sodium hydroxide or magnesium hydroxide may also be employed.

Although the present invention produces particularly excellent effects when used for flue gases from boilers using various oil fuels such as heavy oil, Orimulsion, VR and CWM/heavy oil, similar effects can also be obtained when it is applied, for example, to coal/heavy oil-fired boilers. Even in exclusive coal-fired boilers, an oil fuel may be burned, for example, at the time of starting or during test runs. The present invention may be effectively applied to such cases.

Eighth Embodiment

Figure 10:
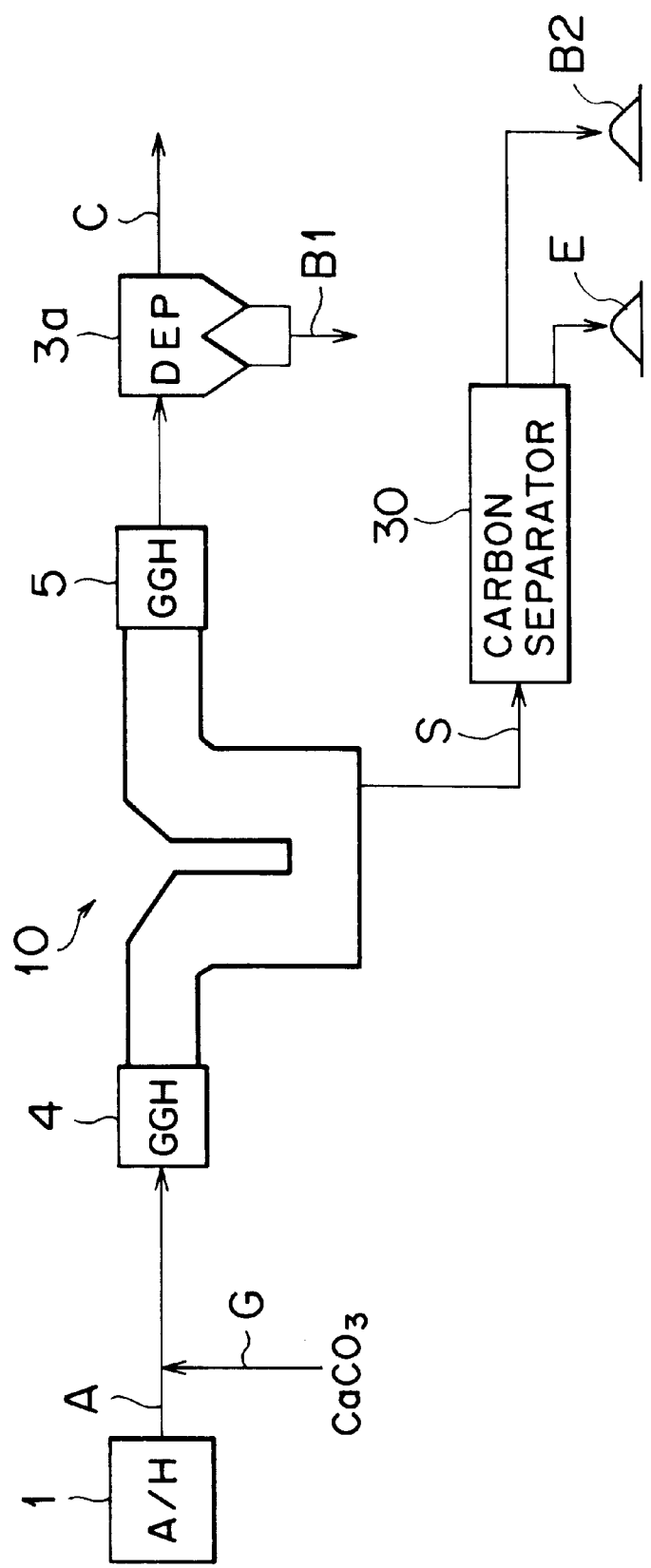
FIG. 10 is a schematic view illustrating the construction of a flue gas treating system in accordance with a eighth embodiment of the present invention.

An eighth embodiment of the present invention is explained with reference to FIG. 10. In FIG. 10, the detailed illustration of the construction of desulfurizer 10 is omitted. This embodiment differs from the conventional flue gas treating system of FIG. 14 in that the ammonia injection step and the dust removal step using electrostatic precipitator 3 are omitted and in that a powder addition means (not shown) for spraying a powder is installed at a position upstream of the heat recovery section 4 of GGH and a step for spraying a powder comprising pulverized limestone ($CaCO_3$) (e.g., the aforesaid limestone G) into flue gas A by using the aforesaid powder addition means (i.e., a powder addition step) is provided prior to the heat recovery step using the aforesaid heat recovery section 4.

Moreover, in this embodiment, a dust removal step for collecting a slight amount of dust or powder B1 remaining in the flue gas having passed through the absorption step in desulfurizer 10 by means of a dry electrostatic precipitator 3a is provided subsequent to the reheating step using reheating section 5, and a carbon separator 30 for separating dust (e.g., unburned carbon) B2 and highly pure gypsum E from gypsum slurry S formed in desulfurizer 10 and discharging them is installed.

Carbon separator 30 functions to carry out the separation step of the present invention for separating solid particles other than gypsum particles, which comprise dust (chiefly unburned carbon) collected in absorbent slurry D within desulfurizer 10, so that they will not mixed in gypsum formed as a by-product. In this embodiment, carbon separator 30 is installed in place of solid-liquid separator 23 used in the conventional flue gas treating system of FIG. 14. More specifically, in this embodiment involving no dust removal prior to the absorption step, most of the dust (e.g., unburned carbon) originally contained in flue gas, together with the added powder (in this case, limestone), is collected in the slurry within the absorption towers of desulfurizer 10, so that gypsum slurry S withdrawn from the absorption tower tank contains a larger amount of foreign matter (i.e., particles of the aforesaid dust) than in the prior art. Accordingly, in order to obtain highly pure gypsum, it is necessary to separate the aforesaid dust constituting foreign matter. In this embodiment, this separation step is very simply realized by using carbon separator 30 based on the floatation process.

Figure 11:
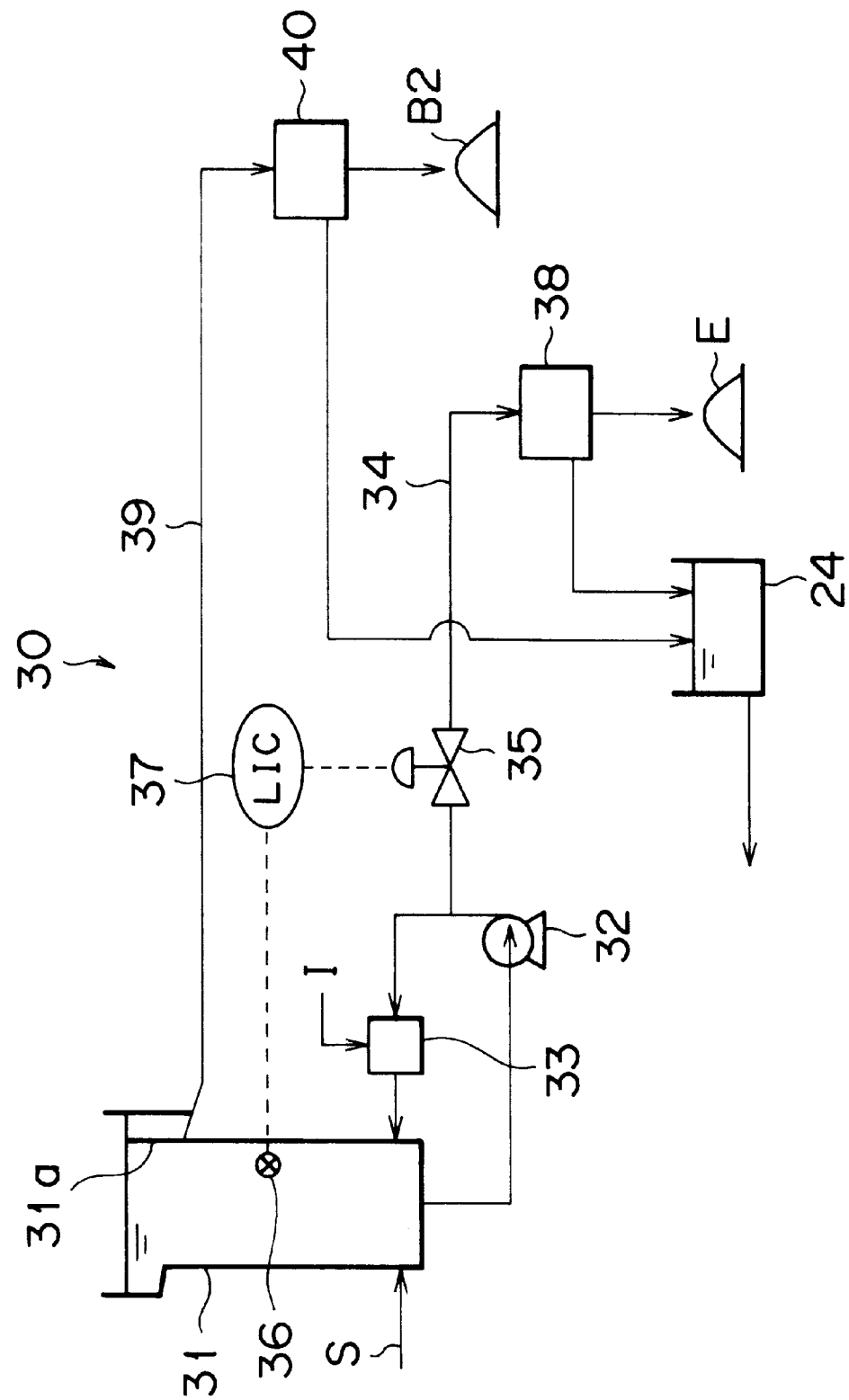
FIG. 11 is a schematic view illustrating the construction of a carbon separator for carrying out the separation step of the present invention.

As shown in FIG. 11, the aforesaid carbon separator 30 consists, for example, of a bubble tower 31 into which gypsum slurry S is introduced, a circulating pump 32 for circulating the slurry within bubble tower 31, an air injector 33 installed on the delivery side of circulating pump 32 for blowing air I into the circulating slurry, a withdrawal line 34 branching from the delivery side of circulating pump 32, a flow control valve 35 installed in withdrawal line 34, a sensor 36 for detecting the liquid level of bubble tower 31, a level controller 37 for regulating the opening of flow control valve 35 on the basis of the detection signal of sensor 36 and thereby maintaining the liquid level of bubble tower 31 within predetermined limits, a solid-liquid separator 38 for effecting solid-liquid separation of the slurry withdrawn through withdrawal line 34, a withdrawal line 39 for withdrawing the slurry from the upper part of bubble tower 31, and a solid-liquid separator 40 for effecting solid-liquid separation of the slurry withdrawn through withdrawal line 39.

The upper part of bubble tower 31 is equipped with an overflow channel 31a, and the liquid level controlled by level controller 37 is set at a position slightly higher than this overflow groove 31a. Thus, a dust slurry containing dust at a high concentration flows beyond this overflow channel 31a and is withdrawn through withdrawal line 39.

More specifically, air I injected by air injector 33 is introduced into bubble tower 31 in the form of air bubbles, which rise to the surface of the slurry within bubble tower 31. During this process, dust (e.g., unburned carbon) present in gypsum slurry S, which comprises solid particles having a hydrophobic surface, adheres to the air bubbles, moves upward together with them, and rises to the surface of the slurry. On the other hand, gypsum particles having a hydrophilic surface do not adhere to the air bubbles, but oppositely settles by gravity and accumulate at the bottom of the bubble tower. Consequently, the slurry withdrawn through withdrawal line 34 contains gypsum-based solid matter at a high concentration, while the slurry withdrawn through withdrawal line 39 contains dust-based solid matter at a high concentration.

In this connection, experiments conducted by the present inventors have revealed that such a simple treatment can separate dust with a degree of dust removal of not less than 90%.

As an alternative method for producing air bubbles within bubble tower 31, air bubbles may be produced, for example, by agitating the slurry within bubble tower 31, instead of injecting air thereinto.

Now, the powder addition means for carrying out the powder addition step of the present invention is explained. As this powder addition means, any suitable means, for example, designed for pneumatic conveyance or slurry conveyance may be used. An example of a usable powder addition means designed for pneumatic conveyance is one consisting of a blower or air compressor and a pipeline for conveying the powder in a stream of air, and a fixed nozzle for scattering and injecting the pneumatically conveyed powder into the flue gas duct. An example of a usable powder addition means designed for slurry conveyance is one consisting of a stirred tank for dispersing the powder in a liquid to form a slurry, a slurry pump for pressurizing and conveying the slurry formed in the stirred tank, and a fixed nozzle for scattering and injecting the pressurized and conveyed slurry into the flue gas duct.

When the powder is sprayed in the form of a slurry, it is preferable that the liquid constituting the slurry be immediately evaporated by the heat of the flue gas so as to efficiently achieve the effect of capturing $SO_3$ on the particle surfaces of the powder. Common water (e.g., industrial water) is adequate for use as this liquid. Since the temperature of flue gas A is as high as about 160° C., the water in the sprayed slurry will be evaporated at once.

The solid content of the slurry may be of the same order as the solid content of the absorbent slurry in desulfurizer 10 (e.g., about 20 to 30% by weight). Trial calculations made by the present inventors indicate that, even when the powder is sprayed in the form of a slurry, its amount may be slight relative to the flue gas as will be described later. Accordingly, the temperature of the flue gas will be reduced by only several degrees centigrade and hence exert no adverse influence on the subsequent heat recovery in GGH.

That is, even when limestone G used as the powder for providing a countermeasure against $SO_3$ is sprayed in the form of a slurry, it may be added in such a low proportion that the weight ratio (D/S) of the amount of powder (D) present in a unit volume of the flue gas to the amount of $SO_3$ (S) present in a unit volume of the flue gas is, for example, not less than 2 (i.e., D/S≧2).

As will be described later, most of limestone G added to the flue gas in this manner is collected in the absorption towers and functions as the absorbent in desulfurizer 10. Accordingly, the total amount of limestone required for use in the absorption step in desulfurizer 10 and in the formation of gypsum as a by-product may be added to the flue gas as the aforesaid powder at a position upstream of heat recovery section 4, so that the absorbent will be indirectly supplied to the slurry within tank 11 of desulfurizer 10. This makes it possible to omit slurry preparation tank 26 and slurry pump 27 shown in FIG. 14 and thereby achieve a further simplification of equipment construction.

In this case, filtrate F1 may be treated, for example, by returning it directly to tank 11 of the absorption towers, or part of it may be used as the liquid required to spray limestone G in the form of a slurry.

Moreover, in this case, the amount of limestone G required for use as the absorbent is basically in stoichiometric proportion to the amount of sulfur oxides present in the flue gas. When flue gas A comprises common combustion exhaust gas (e.g., flue gas produced from an oil fuel such as heavy oil), trial calculations made by the present inventors have revealed that the weight ratio (D/S) of the amount of powder (D) present in a unit volume of the flue gas to the amount of $SO_3$ (S) present in a unit volume of the flue gas has a sufficient value of about 28.

According to the flue gas treatment of this embodiment, the previously described function of the powder is performed positively and satisfactorily, so that a countermeasure against $SO_3$ present in flue gas can be achieved at low cost and with simple operation and equipment construction without resorting to ammonia injection.

More specifically, even if $SO_3$ present in the flue gas condenses, for example, as a result of cooling in the heat recovery section 4 of GGH, most of this condensation occurs on the particle surfaces of the powder present in the flue gas (i.e., the powder comprising the limestone added thereto and the dust originally contained therein). Consequently, $H_2SO_4$ particles formed by the condensation of $SO_3$ exist in a state bound to the particles of the aforesaid powder, resulting in little production of harmful fumes (or sulfuric acid mist).

Moreover, since the added limestone and the dust present in the flue gas have a relatively large particle diameter of the order of 10 to 100 μm, they can be collected in absorption towers 12 and 13 of desulfurizer 10 with a relatively high degree of collection, as compared not only with conventionally encountered sulfuric acid mist but also with conventionally encountered ammonium sulfate dust. Consequently, they scarcely remain in the resulting treated flue gas C. Especially in the embodiment, a dust removal step for collecting a slight amount of dust or powder remaining in the flue gas having passed through the absorption step in desulfurizer 10 as solid matter B1 by means of dry electrostatic precipitator 3a, so that the added powder (i.e., limestone in the case) and the dust (chiefly unburned carbon) are scarcely contained in treated flue gas C. Thus, a very high degree of purification of flue gas can be achieved from the viewpoint of dedusting capability.

The limestone collected in absorption towers 12 and 13 is dissolved or suspended in the circulating slurry, and acts as the aforesaid absorbent (or alkaline agent) for neutralizing the slurry to form gypsum as a by-product. On the other hand, the sulfuric acid which has been formed by the condensation of $SO_3$ on the surfaces of the limestone and the like and has been collected together with the limestone and the like finally undergoes the previously described neutralization reaction (3) with limestone, for example, in tank 11 of the absorption towers to yield a part of the gypsum formed as a by-product.

Thus, according to this embodiment, scale formation and corrosion due to $SO_3$ are reliably prevented in the heat recovery section 4 of GGH and the ducts positioned downstream thereof. Moreover, a variety of practically favorable effects are produced.

That is, not only the same effects as the previously described effects (1) to (6), but also the following effects are produced.

(8) In this embodiment, when limestone used as the powder is sprayed in the form of a slurry, apparatus and devices conventionally used in a desulfurization system or the like, such as a stirred tank for the preparation of a slurry, slurry pumps, and nozzles for spraying the slurry, may be used without any modification. This is advantageous from the viewpoint of equipment cost and system operability. In addition, this makes it easier to disperse the powder uniformly in the flue gas as compared with pneumatic conveyance, so that troubles due to $SO_3$ can be prevented more efficiently.

Moreover, in this case, the particles of limestone G are maintained at a lower temperature owing to the cooling effect produced by the evaporation of the liquid of the slurry into the flue gas (or the keeping cool effect produced by the presence of the liquid of the slurry). Consequently, the condensation of $SO_3$ on the particle surfaces of limestone G is promoted, so that the $SO_3$-capturing function of limestone G used as the powder is performed more satisfactorily.

(9) Moreover, in this embodiment, the dust removal step using an electrostatic precipitator disposed upstream of the absorption step and the heat recovery step is eliminated, and the dust (e.g., unburned carbon) originally contained in flue gas, together with the added powder, is collected in the absorption towers of desulfurizer 10. This can afford a marked reduction in cost as compared with the conventional system in which large-sized and expensive electrostatic precipitator 3 is independently installed on the upstream side of the desulfurizer.

When compared with the conventional system of FIG. 14, the system of this embodiment includes additional apparatus such as electrostatic precipitator 3a installed on the downstream side of the desulfurizer, and carbon separator 30. Nevertheless, the aforesaid reduction in cost can be achieved in this case. The reason for this is that carbon separator 30 is an apparatus having a simple construction as described previously, and causes only a slight increase in equipment cost and operating cost as compared with large-sized and expensive electrostatic precipitator 3 which has been required in the conventional system. Moreover, electrostatic precipitator 3a installed on the downstream side of the desulfurizer involves a significantly lower load, and may hence be small-sized as compared with the aforesaid conventional electrostatic precipitator 3. Furthermore, it is to be understood that this electrostatic precipitator 3a is required especially when high dedusting capability is desired.

(10) Furthermore, this embodiment also has the advantage that, since dust (e.g., unburned carbon) which constituting foreign matter to gypsum is separated by the separation step carried out in the above-described carbon separator 30, highly pure gypsum can be obtained in spite of the construction involving positive dust removal in the absorption towers of desulfurizer 10.

Ninth Embodiment

Figure 12:
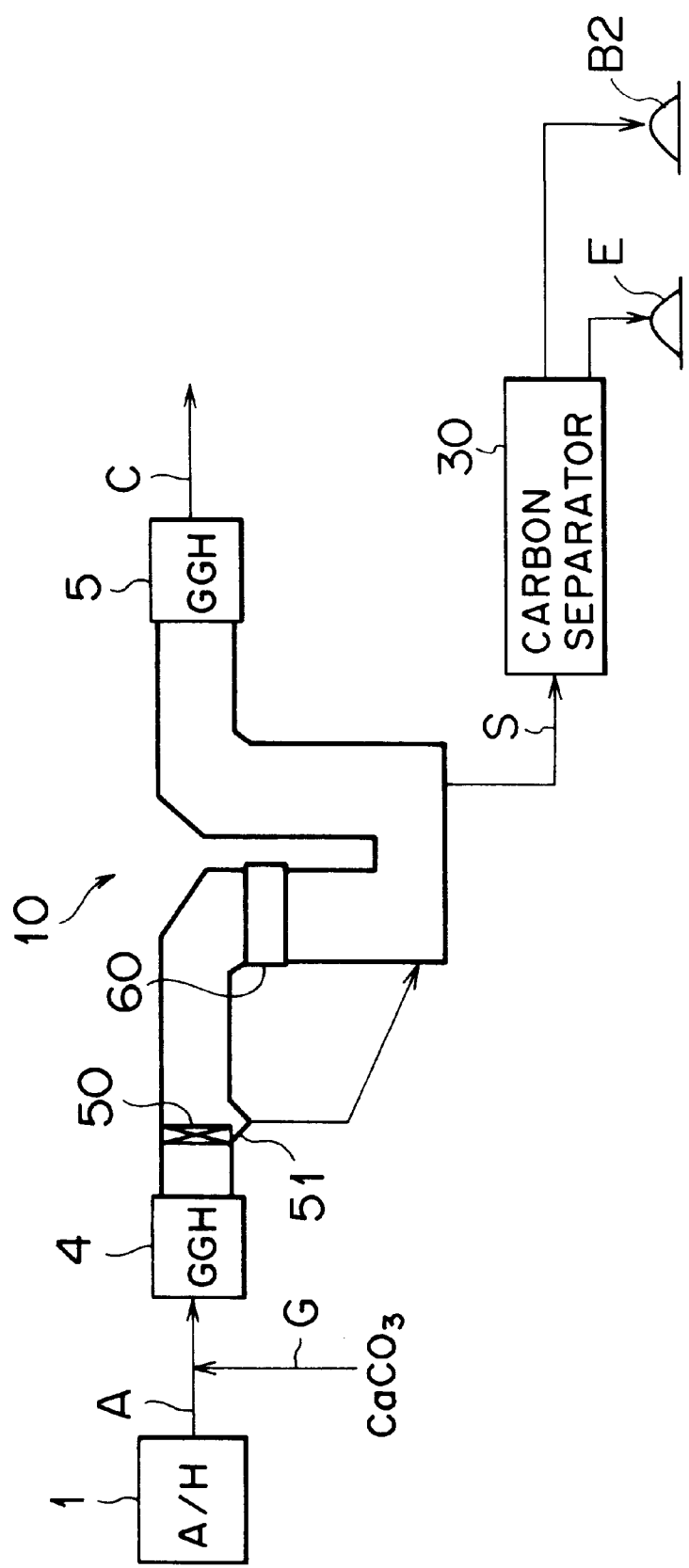
FIG. 12 is a schematic view illustrating the construction of a flue gas treating system in accordance with a ninth embodiment of the present invention.

Next, a ninth embodiment of the present invention is explained with reference to FIG. 12. It is to be understood that the detailed illustration of the construction of desulfurizer 10 is omitted in FIG. 12. This embodiment is basically similar to the eighth embodiment in that limestone is sprayed as the powder of the present invention at a position upstream of the heat recovery section 4 of GGH. However, this embodiment is characterized in that, in place of the aforesaid electrostatic precipitator 3a, a rough separator 50 and a precharger 60 are installed in order to achieve higher dedusting capability.

Rough separator 50 may comprise, for example, a solid particle separator of the folded plate type. This is installed on the downstream side of the heat recovery section 4 of GGH and used to carry out the rough dust removal step of the present invention for separating some dust from the flue gas. More specifically, this rough separator 50 is equipped, for example, with a plurality of plates (not shown) folded into a zigzag shape and disposed in the flow path of flue gas. Thus, solid particles (i.e., the aforesaid powder or dust) flowing together with the gas constituting the flue gas are made to strike against the surfaces of these folded plates and thereby fall into a recovery hopper 51. The aforesaid folded plates may be washed by supplying washing water as required. The solid particles accumulated in recovery hopper 51, together with the washing water, is transferred to absorption tank 11 of desulfurizer 10 by gravity and introduced into the slurry (or absorbing fluid) used in the absorption step.

Precharger 60 is installed at the inlet of an absorption tower of desulfurizer 10 (in this case, in the upper part of parallel-flow absorption tower 12), and comprises a simple apparatus for carrying out the precharging step of the present invention. More specifically, this apparatus has a discharge electrode and a dust collecting electrode (not shown), and collects solid particles present in the flue gas (i.e., the aforesaid dust or powder) temporarily by imparting an electric charge to the solid particles as a result of corona discharge from the discharge electrode and allowing the charged solid particles to migrate to the dust collecting electrode having an opposite sign on the basis of Coulomb force.

Then, an impact is periodically given to the dust collecting electrode by means of a hammering device (not shown), so that the collected solid particles are swept off into the absorption tower. The collected solid particles are aggregated and coarsened while they are held on the dust collecting electrode for a predetermined period of time. Although it is difficult to collect relatively fine solid particles in the absorption towers of desulfurizer 10, this precharger 60 coarsens such solid particles and enables them to be collected in the absorption towers, so that the dedusting capability of desulfurizer 10 is improved.

According to the flue gas treatment of this embodiment, the following unique effect is produced in addition to the effects described above in connection with the eighth embodiment. That is, the dedusting load of desulfurizer 10 is lessened by the rough dust removal step using rough separator 50, and the dedusting capability of desulfurizer 10 is improved by the precharging step using precharger 60. Consequently, in spite of the construction using no expensive electrostatic precipitator having a common structure, high dedusting capability can be achieved in the whole treating system.

Moreover, in this embodiment, the dust separated from flue gas comprises only dust B2 discharged from carbon separator 30, and is hence recovered at a single position. Consequently, this embodiment has the advantage of facilitating the dust recovery operation.

It is to be understood that, similarly to electrostatic precipitator 3a used in the eighth embodiment, the aforesaid rough separator 50 and precharger 60 may not be used depending on the desired dedusting capability (i.e., the dust concentration in treated flue gas C). Moreover, depending on the desired dedusting capability, it is also possible, for example, to install precharger 60 alone while omitting rough separator 50. In any case, these rough separator 50 and precharger 60 have a simple structure and involve a low operating cost, as compared with the large-sized dry electrostatic precipitator which has been independently installed on the upstream side of a conventional desulfurizer. Consequently, this can afford a reduction in cost while maintaining high dedusting capability.

Figure 13:
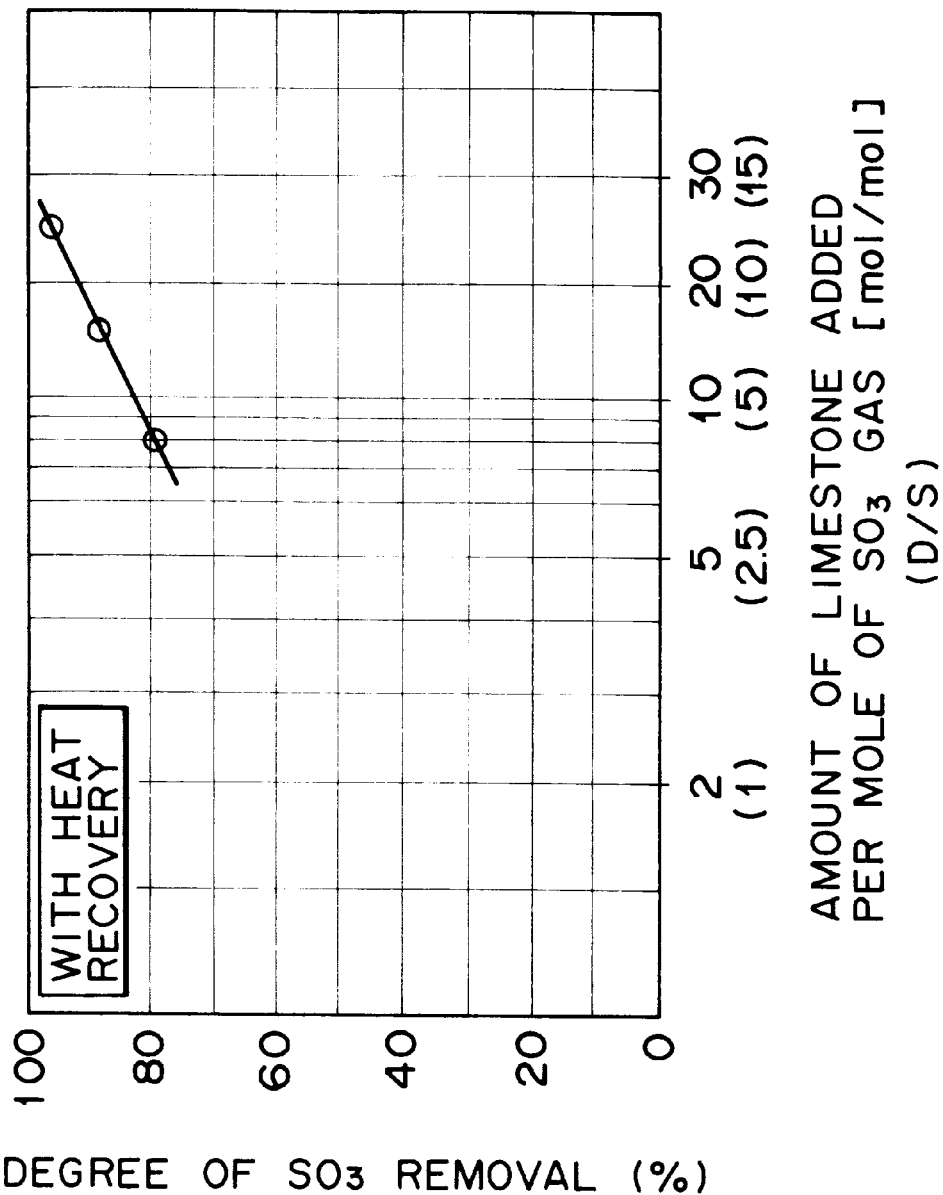
FIG. 13 is a graph showing data which demonstrate the effects of the present invention.

FIGS. 4, 5 and 13 show actually measured data demonstrating the effects of the powder of the present invention.

In the fractional notation of FIG. 4, the denominator represents the D/S ratio and the numerator represents the coal ash concentration.

It can be seen from the data of FIG. 4 that about 90% of $SO_3$ was removed even at a D/S value of about 1.5, no deposition of $SO_3$ mist on the equipment surfaces was observed, and the amount of $SO_3$ mist remaining in the effluent flue gas was as small as about 10%. Consequently, it is obvious that, according to the present invention in which a powder is added to flue gas, for example, in such a proportion that D/S is not less than about 2, $SO_3$ mist will be almost completely removed and will scarcely remain in the treated flue gas, and corrosion or scale formation due to the deposition of mist can be prevented with high reliability.

Since the above-described mist-removing effect of coal ash is a physical phenomenon in which $SO_3$ is allowed to condense on the surfaces of particles present in flue gas, powders other than coal ash (e.g., pulverized limestone and gypsum-based solid matter) will produce similar effects.

Moreover, the data of FIG. 5 reveal that $SO_3$ can be effectively removed simply by spraying a slurry of limestone into the flue. Consequently, it can be seen that, according to the present invention in which heat recovery is effected after the addition of a powder so as to allow $SO_3$ to condense positively, a high degree of $SO_3$ removal can be achieved even at a low D/S value.

The data of FIG. 13 show the results of an actual service test in which limestone was pneumatically conveyed and sprayed into flue gas at a position upstream of GGH (and downstream of the electrostatic precipitator) in the flue gas treating system of an actual electric power plant. The test conditions employed were as follows.

Boiler capacity: 220 MW

Type of GGH: Ljungstrom type

Absorption tower of desulfurizer: Parallel-flow grid packed tower

Electrostatic precipitation on the upstream side of desulfurizer: Yes

Flow rate of flue gas: 1,100,000 $m^3N/h$ $SO_3$ concentration in untreated flue gas: 15–20 ppm Dust concentration at the inlet of desulfurizer: 20–70 $mg/m^3N$ Amount of limestone added: 200–2,000 mg/m³N As is evident from these test results, a degree of $SO_3$ removal of not less than 90% can be achieved by adding limestone into flue gas at a position upstream of GGH, for example, in such a proportion that D/S is not less than about 10. In this test, the dust concentration in the treated flue gas (i.e., the flue gas at the outlet of the desulfurizer) was measured at the same time. Although the dust concentration at the outlet of the desulfurizer increases slightly as a result of the addition of limestone, it is not greater than about 30 mg/m³N. Thus, it can be seen that sufficiently high dedusting capability can be achieved by installing a s mall-sized dry electrostatic precipitator or the like on the downstream side of the desulfurizer.

It is to be understood that the present invention is not limited to the above-described eighth and ninth embodiments, but may also be practiced in various other ways. For example, the dry electrostatic precipitator installed on the downstream side of desulfurizer 10 may be replaced by a wet precipitator(wet electrostatic precipitator). However, since such a wet precipitator cools the flue gas, it must be installed on the upstream side of reheating section 5.

Moreover, the powder of the present invention is not limited to limestone, but coal ash and gypsum may also be used. In addition, there may also be used any powder that allows $SO_3$ to condense on the particle surf aces thereof and can be collected in a common electrostatic precipitator or the absorption tower of a desulfurizer.

However, the aforesaid limestone, coal ash and gypsum are familiar materials which have conventionally been handled in flue gas treating systems, and the existing equipment and handling techniques may be used without any modification. Thus, they have the advantages that they can be obtained and handled easily, and that they exert no adverse influence on the operation of the whole system and, on the contrary, the trouble of supplying limestone to the absorption tower tank can be saved as described previously.

On the other hand, this embodiment has the disadvantage that, when coal ash, for example, is added as the powder of the present invention, dust (i.e., foreign matter to gypsum) present in the flue gas introduced into the desulfurizer increases correspondingly, resulting in a corresponding increase in the load imposed on carbon separator 30. From this point of view, therefore, it is preferable to use limestone or gypsum as the powder of the present invention. When gypsum is used, this may be done, for example, by pulverizing gypsum E recovered from desulfurizer 10 while drying it as required, and adding it to the flue gas by pneumatic conveyance, or by withdrawing part of gypsum slurry S within the absorption tower tank of desulfurizer 10 and spraying it directly into the flue gas at a position upstream of the heat recovery section 4 of GGH.

Moreover, in order to promote the condensation of $SO_3$ on the particle surfaces of the powder, a powder (or a slurry thereof) having a temperature lower than that of flue gas [e.g., a powder (or a slurry thereof) which has been forcedly cooled as required] may be sprayed into the flue gas. This allows $SO_3$ to condense more effectively on the particle surfaces of the powder, so that the production of harmful $SO_3$ mist can be prevented more satisfactorily and more easily.

Moreover, the powder of the present invention may comprise, for example, both limestone and coal ash, and they may be added in admixture or separately. Even when limestone alone is used, it may be added in such a way that only the part thereof required to capture $SO_3$ is sprayed into flue gas and the remainder is supplied directly to the absorption tower tank of the desulfurizer as usual.

Furthermore, it goes without saying that the construction of the absorption step or absorption tower of the present invention is not limited to the above-described embodiments. For example, the absorption tower may comprise a single absorption tower, and various types of absorption towers (or gas-liquid contact apparatus) including packed tower, spray tower and bubbling tower types may be employed.

Although the present invention produces particularly excellent effects when used for flue gases from boilers using various oil fuels such as heavy oil, Orimulsion, VR and CWM/heavy oil, similar effects can also be obtained when it is applied, for example, to coal/heavy oil-fired boilers. Even in exclusive coal-fired boilers, an oil fuel may be burned, for example, at the time of starting or during test runs. The present invention may be effectively applied to such cases.

As described above, in the present invention, a powder addition step for spraying a powder collectable in the absorption step into flue gas is provided prior to the heat recovery step using a heat exchanger. Consequently, even if $SO_3$ present in the flue gas condenses in or after this powder addition step (e.g., as a result of cooling in the aforesaid heat recovery step), this condensation occurs only on the particle surfaces of the aforesaid powder. Consequently, $H_2SO_4$ particles formed by the condensation of $SO_3$ exist in a state bound to the particles of the aforesaid powder, resulting in a decrease in the production of harmful fumes (or sulfuric acid mist). Moreover, since this powder is collectable in the absorption tower, the aforesaid $H_2SO_4$ particles, together with the powder, are collected in the absorption tower. Consequently, the powder and the $H_2SO_4$ particles scarcely remain at least in the treated flue gas.

Thus, according to the present invention, a countermeasure against $SO_3$ present in flue gas can be easily achieved without resorting to ammonia injection and the flue gas can further be purified without the disadvantage of causing the injected substance to remain in the treated flue gas.

Especially when the aforesaid powder is sprayed in such a proportion that the weight ratio (D/S) of the amount of dust (D) including the aforesaid powder to the amount of $SO_3$ (S) present in the flue gas is not less than 2 (i.e., D/S≧2), most of the condensation of $SO_3$ occurs on the particle surfaces of the aforesaid powder and the like. This makes it possible to avoid the production of harmful fumes (or sulfuric acid mist) with substantial certainty and prevent $SO_3$ from causing scale formation or corrosion with high reliability.

Moreover, in the present invention, it is possible to carry out at least no independent treatment for dust removal from the flue gas by means of an electrostatic precipitator prior to the heat recovery step and the absorption step so that most of the dust present in the flue gas, together with the added powder, may be collected in the absorbing fluid, and to provide a separation step for separating solid particles other than gypsum particles, which comprise at least the dust collected in the absorbing fluid, from the gypsum. Consequently, dust removal from the flue gas is also effected in the absorption step. Thus, a further simplification of the equipment or operation and a further reduction in cost can be achieved as compared with the conventional flue gas treating process which involves dust removal using a large-sized and expensive electrostatic precipitator installed on the upstream side of the absorption step. In addition, since dust (e.g., unburned carbon) constituting foreign matter to gypsum is separated in the separation step, highly pure gypsum can be obtained in spite of the construction involving positive dust removal in the absorption step.

The various effects of the present invention, including the above-described ones, can be itemized as follows:

(1) The consumption of ammonia is reduced to zero, resulting in a marked saving in operating cost.

(2) The equipment for ammonia injection becomes unnecessary and the duct need not be specially lengthened in order to allow ammonia to diffuse, so that a corresponding reduction in equipment cost and equipment size can be achieved.

(3) Since no nitrogen component is contained in the desulfurization waste water, the necessity of a troublesome treatment for the removal of nitrogen is eliminated prior to the disposal of the desulfurization waste water. From this point of view, a reduction in equipment cost and equipment size can also be achieved.

(4) The amount of ammonia contained in the treated flue gas and discharged into the atmosphere is reduced to zero. This not only contributes greatly to a further purification of flue gas, but also makes it easy to cope with ammonia emission regulations in the future.

(5) When the lime-gypsum method is employed, the gypsum formed as a by-product contains no ammonia. Consequently, the gypsum need not be washed, for example, in order to remove an offensive odor.

(6) Since no dust comprising sulfuric acid mist and ammonium sulfate dust remains in the treated flue gas as contrasted with the prior art, the overall dedusting capability of the system is improved without resorting to a means such as a wet dust precipitator installed on the downstream side of the absorption tower. This also contributes to a further purification of flue gas.

(7) A marked reduction in cost can be achieved as compared with the prior art in which a large-sized and expensive electrostatic precipitator is installed on the upstream side of the desulfurizer.

Especially when the flue gas treating process is provided with a dust removal step for collecting the dust or powder remaining in the flue gas having passed through said absorption step by means of a dry electrostatic precipitator or a wet dust precipitator, or when the flue gas treating process is provided with a precharging step for aggregating and coarsening dust or powder present in the flue gas and also with a rough dust removal step for separating some dust or powder from the flue gas by means of a rough separator of the folded plate type and introducing it into the absorbing fluid used in the absorption step, not only a reduction in cost can be achieved as compared with the prior art, but also the overall dedusting capability of the system can be improved.

(8) The present invention also has the advantage that, since dust (e.g., unburned carbon) constituting foreign matter to gypsum is separated in the above-described separation step, highly pure gypsum can be obtained in spite of the construction involving positive dust removal in the absorption step.

Moreover, when the temperature of the powder sprayed into flue gas is made lower than that of the flue gas, $SO_3$ is allowed to condense more effectively on the particle surfaces of the powder, so that the production of harmful $SO_3$ mist can be prevented more satisfactorily and more easily.

Moreover, when the powder is suspended in a liquid and sprayed in the form of a slurry, apparatus and devices conventionally used in a desulfurization system or the like, such as a stirred tank for the preparation of a slurry, slurry pumps, and nozzles for spraying the slurry, may be used without any modification. This is advantageous from the viewpoint of equipment cost and system operability. In addition, this makes it easier to disperse the powder uniformly in the flue gas as compared with pneumatic conveyance, so that troubles due to $SO_3$ can be prevented more efficiently.

Moreover, in this embodiment, the particles of coal ash H are maintained at a lower temperature owing to the cooling effect produced by the evaporation of the liquid of the slurry into the flue gas (or the keeping cool effect produced by the presence of the liquid of the slurry). Consequently, the condensation of $SO_3$ on the particle surfaces of the powder is promoted, so that the $SO_3$-capturing function of the powder is performed more satisfactorily.

Moreover, a high degree of purification of flue gas can be achieved even when dust contained in the combustion exhaust gas of coal (i.e., coal ash) is used as the aforesaid powder. More specifically, since coal ash has a relatively large particle diameter of the order of several tens of micrometers, it can be collected in the absorption towers with a relatively high degree of collection, as compared not only with conventionally encountered sulfuric acid mist but also with conventionally encountered ammonium sulfate dust. Consequently, the coal ash scarcely remains in the resulting treated flue gas.

Moreover, similarly to limestone, coal ash is a familiar material which has conventionally been handled in flue gas treating systems, and the existing equipment and handling techniques may be used without any modification. Thus, coal ash can be obtained and handled easily, resulting in a further reduction in operating cost and equipment cost. In particular, coal ash is usually disposed of as an industrial waste in exclusive coal-fired thermal electric power plants and the like, and can hence be advantageously obtained almost free of expense.

On the other hand, when a dust collection step for collecting dust present in flue gas by means of a dry electrostatic precipitator is installed subsequent to the heat recovery step (i.e, the heat exchanger) and prior to the absorption step (i.e., the absorption tower), and at least part of the dust collected in this dust collection step is reused as the aforesaid powder, the following unique effect is produced in addition to the above-described basic effects.

That is, the construction of this embodiment represents the so-called high-performance system in which a heat exchanger is disposed upstream of an electrostatic precipitator, so that the capability per unit capacity of the electrostatic precipitator is improved. Consequently, by using a small-sized electrostatic precipitator, the added coal ash can be removed from the flue gas with a high degree of collection. In addition, the dust originally contained in untreated flue gas is also collected almost completely in this electrostatic precipitator and the absorption tower, and scarcely remains in the resulting treated flue gas.

Thus, also in this embodiment, scale formation and corrosion due to $SO_3$ are reliably prevented in the aforesaid heat exchanger, the ducts positioned downstream thereof, and the hopper of the electrostatic precipitator. Moreover, the same effects as the previously described effects (1) to (6) are produced.

Furthermore, in this embodiment, the powder (comprising coal ash and others) used to capture $SO_3$ is recycled. This has a unique effect in that the amount of fresh coal ash supplied can be decreased and, moreover, the amount of dust (comprising coal ash and others) discharged out of the system can also be decreased. Consequently, as will be described later, this embodiment has a unique effect in that, even when the dust (comprising coal ash and others) to be discharged out of the system is mixed with gypsum formed according to the lime-gypsum method, the amount of such dust can be minimized to maintain the purity of the gypsum at a high level.

Furthermore, when at least part of the dust collected in the dust collection step [i.e., the dust (comprising coal ash and others) to be discharged out of the system] is mixed with the gypsum formed as a by-product according to the lime-gypsum method, the amount of dust discharged as an industrial waste can be reduced to zero. This also contributes, for example, to a saving in operating cost.

On the other hand, when pulverized limestone is used as the aforesaid powder, the added limestone has a large particle diameter of the order of 100 $\mu$m and, therefore, can be collected in the absorption tower (or absorption step) with a markedly higher degree of collection, as compared not only with conventionally encountered sulfuric acid mist but also with conventionally encountered ammonium sulfate dust. Consequently, the limestone scarcely remains in the resulting treated flue gas C. Thus, a particularly high degree of purification of flue gas can be achieved.

Moreover, limestone is a familiar material which has conventionally been handled in flue gas treating systems, and the existing equipment and handling techniques may be used without any modification. Thus, limestone can be obtained and handled easily, resulting in a further reduction in operating cost and equipment cost.

Moreover, limestone has the advantage that, when added to flue gas, it exerts no adverse influence on the operation of the whole system. That is, in this case, the limestone collected in the absorption tower is dissolved or suspended in the absorbing fluid, and acts as the absorbent (or alkaline agent) for neutralizing the absorbing fluid. Thus, on the contrary, limestone promotes the reaction for the absorption of sulfur oxides.

Moreover, when the lime-gypsum method in which limestone is used as the absorbent so as to form gypsum from the absorbed sulfur oxides as a by-product is employed, the embodiment in which limestone is added to flue gas as the powder exerts no adverse influence on the purity of the gypsum, so long as the total amount of limestone added is controlled as usual. In addition, the added limestone is converted into useful gypsum without causing an increase in the amount of industrial waste.

Furthermore, when the absorption step for absorbing $SO_2$ and other sulfur oxides present in flue gas is carried out according to the lime-gypsum method and the total amount of limestone required for use as the absorbent in this absorption step is added to the flue gas as the aforesaid powder, the equipment conventionally used, for example, to form limestone into slurry and supply it to the absorption tower tank becomes unnecessary. This can afford, for example, a further reduction in equipment cost.

On the other hand, when solid matter present in the absorbing fluid having undergone gas-liquid contact with flue gas (i.e., the solid matter consisting essentially of gypsum formed as a by-product according to the lime-gypsum method) is used as the aforesaid powder, the added solid matter usually has a large particle diameter of the order of 20 to 40 $\mu$m and, therefore, can be collected in the absorption tower (or absorption step) with a high degree of collection, as compared not only with conventionally encountered sulfuric acid mist but also with conventionally encountered ammonium sulfate dust. Consequently, the solid matter scarcely remain in the resulting treated flue gas. Thus, a particularly high degree of purification of flue gas can also be achieved. Moreover, the same effects as the previously described effects (1) to (6) are produced.

Moreover, since solid matter consisting essentially of a by-product formed in the absorption step is used as the powder, this embodiment has a unique effect in that the addition of the powder does not cause any reduction in the purity of the aforesaid by-product and, therefore, the purity of the by-product can be maintained at a particularly high level.

Furthermore, solid matter (e.g., gypsum) present in the absorbing fluid is a familiar material which has conventionally been handled in flue gas treating systems, and the existing equipment and handling techniques may be used without any modification. Thus, a further reduction in operating cost and equipment cost can be achieved.

Especially when the slurry-like absorbing fluid containing solid matter consisting essentially of a by-product (e.g., gypsum) formed by contact with flue gas in the absorption tower (or absorption step) is sprayed directly into flue gas as a slurry containing the powder of the present invention, this embodiment has a unique effect in that the equipment construction is highly simplified and, therefore, a great advantage is gained from the viewpoint of cost. More specifically, an embodiment in which, for example, coal ash is sprayed in the form of a slurry requires additional apparatus such as a tank for the preparation of a slurry and a storage means for coal ash, and an embodiment in which solid matter present in the absorbing fluid is dried and sprayed into flue gas requires additional apparatus such as a drier for drying the solid matter. However, this equipment does not require such apparatus at all.

What is claimed is:

1. A flue gas treating process for the treatment of flue gas containing at least $SO_2$ and $SO_3$ which includes a heat recovery step for recovering heat from the flue gas by means of a heat exchanger and thereby cooling the flue gas, and a subsequent absorption step for bringing the flue gas into gas-liquid contact with an absorbing fluid in an absorption tower so as to remove at least $SO_2$ present in the flue gas by absorption into the absorbing fluid, wherein a powder addition step for spraying a powder of coal ash collectable in said absorption step into the flue gas is provided prior to said heat recovery step, said powder is sprayed into the flue gas in the form of a slurry comprising said powder suspended in a liquid, and the absorbing fluid having undergone gas-liquid contact with the flue gas in said absorption step is sprayed into the flue gas as said slurry so that the solid matter present in the absorbing fluid may be used as said powder.

2. A flue gas treating process as claimed in claim 1 wherein said slurry companies said powder suspended in a liquid and in such proportion that the weight ratio (D/S) of the amount of dust (D) included in said powder to the amount of $SO_3(S)$ present in the flue gas is not less than about 2.

3. A flue gas treating process for the treatment of flue gas containing at least $SO_2$ and $SO_3$ which includes a heat recovery step for recovering heat from the flue gas by means of a heat exchanger and thereby cooling the flue gas, and a subsequent absorption step for bringing the flue gas into gas-liquid contact with an absorbing fluid in an absorption tower so as to remove at least $SO_2$ present in the flue gas by absorption into the absorbing fluid, wherein a powder addition step for spraying a powder of coal ash collectable in said absorption step into the flue gas is provided prior to said heat recovery step.

4. A flue gas treating process as claimed in claim 3 wherein said spraying step includes pneumatically conveying said powder into the flue gas.

5. A flue gas treating process as claimed in claim 3 wherein said spraying step includes conveying said powder into the flue gas in a slurry.

6. A flue gas treating process as claimed in claim 5 wherein said slurry includes water.

7. A flue gas treating process as claimed in claim 3 wherein said slurry comprises said powder suspended in a liquid and in such proportion that the weight ratio (D/S) of the amount of dust (D) included in said powder to the amount of $SO_3$(S) present in the flue gas is not less than about 2.

8. A flue gas treating process as claimed in claim 3 wherein the powder of coal ash is produced by an electrostatic precipitator located in a flue gas treating system.

9. A flue gas treating process as claimed in claim 8 wherein the electrostatic precipitator is located in a flue gas treating system of a coal-fired boiler.

* * * * *